US006915607B2

(12) United States Patent
Tagawa et al.

(10) Patent No.: US 6,915,607 B2
(45) Date of Patent: Jul. 12, 2005

(54) OPERATIONAL SYSTEM FOR TRANSPLANTING GROWING PLANTS

(75) Inventors: George H. Tagawa, Brighton, CO (US); Kenneth K. Tagawa, Brighton, CO (US); Randall E. Tagawa, Broomfield, CO (US); William A. Kluth, Broomfield, CO (US); Fred Naylor Blackmore, Jr., Saline, MI (US)

(73) Assignee: Tagawa Greenhouses, Inc., Brighton, CO (US)

( * ) Notice: Subject to any disclaimer, the term of this patent is extended or adjusted under 35 U.S.C. 154(b) by 0 days.

(21) Appl. No.: 10/167,693

(22) Filed: Jun. 10, 2002

(65) Prior Publication Data

US 2003/0029087 A1 Feb. 13, 2003

Related U.S. Application Data

(60) Provisional application No. 60/296,915, filed on Jun. 8, 2001.

(51) Int. Cl.[7] .......................... A01G 9/02; A01G 23/02; A01G 9/10

(52) U.S. Cl. ................ 47/87; 47/86; 47/73; 47/77; 47/66.2; 47/66.7; 47/901; 206/423; 206/558; 206/564

(58) Field of Search ............................. D11/156, 155, D11/143; D6/405; 47/65.5, 65.9, 66.1, 73, 77, 87, 86, 1.01 R, 66.2, 66.5, 66.7, 901; 206/423, 558, 564

(56) References Cited

U.S. PATENT DOCUMENTS 3,331,155 A 7/1967 Chancellor ..................... 47/37
3,386,608 A 6/1968 Diller ......................... 220/23.6

(Continued)

OTHER PUBLICATIONS

U.S. Appl. No. 60/263,802, entitled "Growing System to Maximize Plant Transplanting Yields", filed Jan. 24, 2001.

(Continued)

Primary Examiner—Peter M. Poon
Assistant Examiner—Andrea M. Valenti
(74) Attorney, Agent, or Firm—Santangelo Law Offices, P.C.

(57) ABSTRACT

A transplanting system including both methods and specific types of transplant apparatus such as propagule transplant trays(3, 4, 5, 6) addresses the need for the use of a propagule punch machine (8) on a variety of adolescent tray configurations (9, 11, 12, e.g.) and the increased operational efficiency that such enhanced operational capability affords. The system may involve at least one areally continuous propagule tray (3, 4, 5, 6) that is operationally compatible with a numerically significant number of adolescent plant trays. Other embodiments of the invention disclose punch pins (59) for use in a plant punch machine transplanter that are user-detachable and differentially designed so that plant punch elements of a certain design may be installed as part of the machine to customize the transplant process for a given species and transplant modality. The invention also provides for a consultable collection (such as printed documents or an electronic database, e.g.) of plant transplant process information usable to increase transplant process efficiency.

47 Claims, 36 Drawing Sheets

U.S. PATENT DOCUMENTS

| | | |
|---|---|---|
| 3,446,164 A | 5/1969 | Huang et al. .................... 111/3 |
| 3,447,261 A | 6/1969 | Hundt ...................... 47/34.13 |
| 3,517,629 A | 6/1970 | Bridges et al. ............... 111/96 |
| 3,524,419 A | 8/1970 | Middleton ..................... 111/2 |
| 3,561,158 A | 2/1971 | Marcan .................... 47/34.13 |
| 3,712,252 A | 1/1973 | Huang ........................... 111/2 |
| 3,799,078 A | 3/1974 | Blackmore et al. ............. 111/2 |
| 3,820,480 A | 6/1974 | Blackmore et al. ............. 111/2 |
| 3,903,643 A | 9/1975 | Blackmore et al. ........ 47/34.13 |
| 3,949,523 A | 4/1976 | Lehtipuu ................... 47/34.13 |
| 4,050,921 A | 9/1977 | Plant et al. ..................... 71/94 |
| 4,106,414 A | 8/1978 | Vastag ........................... 111/1 |
| 4,120,692 A | 10/1978 | Plant et al. ..................... 71/94 |
| 4,197,674 A | 4/1980 | Blackmore, Jr. ............... 47/73 |
| 4,244,308 A | 1/1981 | Vince .......................... 111/89 |
| 4,248,014 A | 2/1981 | Williames ...................... 47/86 |
| 4,389,814 A | 6/1983 | Andreason et al. ............ 47/73 |
| 4,408,549 A | 10/1983 | Qvarrstrom .................... 111/2 |
| D272,726 S | 2/1984 | Kaneko ........................ D11/2 |
| 4,481,893 A | 11/1984 | Qvarrstrom .................... 111/2 |
| D278,323 S | 4/1985 | Blackmore, Jr. ........... D11/155 |
| 4,616,578 A | 10/1986 | Talbott ........................... 111/2 |
| 4,644,880 A | 2/1987 | Branch .......................... 111/3 |
| 4,910,146 A | 3/1990 | Tur-Kaspa ................... 435/284 |
| 4,947,582 A | 8/1990 | Visser ......................... 47/101 |
| 5,048,434 A | 9/1991 | Forster et al. .............. 111/105 |
| 5,179,800 A | 1/1993 | Huang ............................ 47/73 |
| 5,225,345 A | 7/1993 | Suzuki et al. ................ 435/284 |
| 5,298,041 A | 3/1994 | Huang ............................ 47/58 |
| 5,320,649 A | 6/1994 | Holland ...................... 47/1.01 |
| 5,425,202 A | 6/1995 | Mekler .......................... 47/58 |
| 5,507,116 A | 4/1996 | Gao ............................... 47/18 |
| 5,573,558 A | 11/1996 | Huang ....................... 47/1.01 |
| 5,644,999 A | 7/1997 | Williames ................... 111/105 |
| 5,779,048 A | 7/1998 | Dunn ........................ 206/449 |
| 5,779,049 A | 7/1998 | Werby et al. ............... 206/451 |
| 5,868,086 A | 2/1999 | Williames ................... 111/105 |
| 5,871,102 A | 2/1999 | Lambert ..................... 206/738 |
| 5,935,841 A | 8/1999 | Trinci et al. .............. 435/254.1 |
| 5,979,111 A | 11/1999 | Brown et al. ................... 47/59 |
| D419,913 S | 2/2000 | Thomas et al. ............ D11/156 |
| 6,029,425 A | 2/2000 | Dunn .......................... 53/449 |
| 6,085,462 A | 7/2000 | Thomas ......................... 47/87 |
| 6,357,180 B1 | 3/2002 | Huang ............................ 47/73 |
| 6,385,903 B1 | 5/2002 | Diller et al. ................. 47/66.5 |

OTHER PUBLICATIONS

U.S. Appl. No. 60/276,874, entitled "Automated Plant Transplanting System", filed Mar. 14, 2001.

U.S. Appl. No. 60/273,420, entitled "Coordinated Plant Transplanting System", filed Mar. 5, 2001.

U.S. Appl. No. 60/296,915, entitled "Operational System for Transplanting Growing Plants", filed Jun. 8, 2001.

OPERATIONAL SYSTEM FOR TRANSPLANTING GROWING PLANTS

RELATED APPLICATIONS

This application claims the benefit of U.S. Provisional Application No. 60/296,915 filed Jun. 8, 2001, hereby incorporated by reference.

BACKGROUND OF THE INVENTION

Generally, this invention relates to plant transplant apparatus and methods for transplanting propagules (or plants) in order to improve transplanting yield and/or survivability of transplanted plants and in order to increase the efficiency of the transplant process and reduce processing and related waste. Some embodiments of this invention relate to an operational system for transplanting growing plants that may improve operational functions to maximize transplant yields. In particular, the invention discloses a plant transplanter whose punch pins, or, more generally, plant punch elements, may be user-detachable, so that plant punch elements of a certain design may be installed as part of the machine in order to customize the transplant process for a given application (such as, e.g., the transplanting of a certain species of plant for distribution in a certain geographic location). Such customization for a certain application allows for improvement of transplant yields and/or survivability of transplanted plants. The invention also relates to a plant transplanter that uses at least one plant punch element that is designed (with, e.g., a convex head surface shape) to forcibly push to the side a plant to be transplanted during a transplanting event, resulting in less crushing damage to the transplanted plant and a less intrusive plant punch, and thereby resulting in increased plant yields and/or survivability. The invention further discloses a propagule container tray that is areally continuous (e.g., exhibits an unclustered arrangement of propagule plug containers (or propagule transplant containers)), and that, when used in a plant punch machine (or more generally a plant transplanter), is operationally compatible with a numerically significant number of alternative adolescent plant tray configurations. The invention also provides for a consultable collection (such as printed documents arranged in binder or book, or an electronic database stored on a computer, as but a few examples) of plant transplant process information (such as, e.g., a recommended plant punch element assembly selection for a given propagule container tray configuration and a given adolescent plant tray configuration) combinations. Embodiments of the invention may be viewed as focusing upon techniques and processes that may improve transfer of plant seedlings from a high-density tray to a larger/lower density tray to maximize transplant yields which may in turn decrease production costs and may also increase profits.

BACKGROUND

In the production of greenhouse plants from seeds, seeds may be sown into trays with small cells for individual germination. Seedlings (or propagules) are grown in these small cells for a short time before being transplanted into larger (usually finished) containers or trays. Often greenhouse personnel transplant these individual cells by hand into the larger containers. This process is labor intensive and therefore expensive. Since this process of hand transplanting is not economical, several mechanical methods for transplanting the seedlings from the smaller cells to larger containers have been developed. The seedling can be either pulled up and cut of the cell and then moved to the larger container or pushed down through the bottom of the cell into the larger container. The present invention focuses on tray designs for transferring the seedling by pushing it through the bottom of the cell into the larger container and on a retrievable collection of information regarding input ray (e.g., a propagule plug tray)/output tray (a finished or adolescent plant tray) compatibility and recontinendations as to, e.g., an appropriate plant punch element assembly for a certain application. Note that a plant punch element assembly (or, less generally, a punch plato) is, in at least one embodiment, a structural assembly of punch elements in which each of the punch elements (e.g., punch pins) is held in a substantially fixed position relative to other punch elements (although each punch element may be removable) by a structural part such as a plate. Although each punch element may be held in a substantially fixed position relative to other punch elements, each punch element may be somewhat movable during the punching event (it may, e.g., have a spring-modified allowance for motion along any axis or in any plane).

The desire to improve the efficiency of the plant transplant process (or propagule transplant process) has been known for many years. Traditionally, hand planting was the only available method for transplantation of propagule plugs. It is a time consuming, labor intensive endeavor that is subject to any of the many possible errors that may arise when an individual is performing a repetitive task for long periods of time. As such, use of a propagule plug punch machine became popular in the nursery business and dramatically reduced labor costs and improved transplant yields for transplantation into some finished (or output or adolescent plant) trays.

The use of the propagule plug punch machine, however, did not come without its own limitations. Application limitations of existing plant transplant technology, including the inability of propagule plug punch machine systems to transplant into more than one (or a very few) adolescent plant tray (or output tray) configuration severely compromise the efficiency of the plant transplant process—and of the nursery business to which such process is vitally important. Such application limitations are due at least in part to the very limited selection of propagule plug trays (or input trays) usable by the propagule plug punch machines and to the fact that the only available such trays exhibit a clustered (or areally discontinuous) arrangement of propagule plug containers. This clustered arrangement, although allowing an increased transplanting efficiency over that of hand-transplanting methods, precludes machined transplanting of propagule plugs into finished trays that exhibit spatial arrangements of adolescent plant containers that do not correspond to or match the cluster arrangement of propagule plug containers of the input tray(s). In other words, a clustered propagule plug tray that, e.g., has clusters of propagule plug containers arranged in two rows and six columns (where a row, defined with respect to an installed propagule plug tray, runs in a propagule plug transplant machine operator's left/right direction and a column is defined to run in a propagule plug transplant machine operator's forward/rearward direction), was usable only to fill (i.e., transplant propagule plugs into) an adolescent plant tray that had plant containers that were also arranged in a two row by six column configuration.

Theoretically, such a clustered propagule plug container could perhaps be usable to transplant propagule plugs into more than those finished trays that each exhibited the same configuration (although each would in some way exhibit a two row, six column arrangement). For example (again, theoretically), one 2×6 finished tray might have one plant container for each column/row block (referred to as a 12-01 finished tray), for a total of 12 containers per finished tray. Or perhaps a 2×6 finished tray might have six plant containers for each column/row block (referred to as a 12-06 finished tray) for a total of 72 containers per finished tray. However, in practice, the 2×6, 12-06 finished tray is the only finished tray conventionally used with the propagule plug punch machines, resulting in a severe limitation on the increase in transplanting efficiency that the punch machine might otherwise afford. This practical application limitation is due in large part to the limited availability of different plant punch element assemblies (note that a plant punch element assembly refers to a set of punch elements that may be arranged in a pattern, and each connected at one part (e.g., a terminus) to a plate or other structure that maintains the relative positioning of the punch elements during the punch or transplanting process; a punch element assembly may be identified via a punch plate PIN).

Also, there could have been clustered propagule plug trays made available that themselves exhibited different configurations of clusters, so that there would be other than the two row, six column finished trays that were operational with the propagule plug punch machines. However, in conventional practice, the only available propagule plug tray that was available for a propagule plug punch machine to operate on is clustered in a two row, six column arrangement. Thus, the only finished trays that conventional propagule plug punch machine systems are potentially operable on are those that in some way exhibited a two row, six column arrangement. Again, however, the only two row, six column type finished tray configuration that propagule plug punch machines are used on are the 12-06 finished trays. In practice, with only one available propagule plug tray, and with its use to fill only one finished tray configuration, conventional propagule plug machine systems are extremely limited.

Even if the clustered design of propagule plug trays were expanded to include other configurations (e.g., three rows and four columns; four rows and five columns, etc.), propagule plug machine systems would still be limited in that in order to transplant into a finished tray having a certain type configuration (e.g., three rows by five columns), a propagule plug tray would need to be clustered in a similar type configuration (i.e., in this example, three rows of clusters, five columns of clusters, for a total of 15 clusters). What is needed to improve efficiency is a propagule plug tray that is usable with a numerically significant number of differently configured finished trays. It is this need that at least one embodiment of the inventive technology addresses.

A brief examination of how the transplant process manifests itself in the context of a nursery business may be helpful to an understanding of the effect of the traditional propagule plug punch machine system on operational efficiency. Typically (but not always), a nursery would first receive an order from an adolescent plant distributor for a certain finished tray configuration. Given the limitations as to the configuration of finished trays that the propagule plug punch machines could operate on, the nursery would then determine whether the finished tray configuration ordered by the distributor was the one (or very few) finished tray configuration(s) that the propagule plug punch machine was able to punch propagule plugs into. If it was, then the propagule plug punch machine(s) could be used to reduce labor costs and increase yields. If not, the costly traditional hand transplanting methods were the only available alternative.

A further related problem associated with the existing propagule plug punch machine systems has to do with the uncertainty as to how many of the two row, six column cluster propagule plug trays (which exhibited the only configuration that the traditional propagule plug punch machine system could work with) a nursery should optimally plant to accommodate any orders from distributors that may later arise (often orders that needed to be filled quickly). Often, a nursery found itself with significantly more or fewer than an optimal number of planted propagule plug trays and suffered costly losses associated with such incorrect estimates. There was and is a need for a propagule plug punch machine system that is operable on a small number of propagule trays (perhaps even only one) that are each usable by a propagule plug punch machine to fill more than one finished tray configuration. Such a tray would reduce the risk that a forecasting error as to expected demand for a certain finished tray configuration would compromise process efficiency.

One type of propagule tray that was developed to push the seedling and seedling rooting media through the bottom of the seedling tray into a larger container or tray is as depicted in FIG. 1. This tray exhibits the clustered design that limits the compatibility of propagule transplant trays, specifically with regard to which finished or adolescent plant trays a plant punch machine using such propagule transplant trays punches into. In fact, as mentioned, such clustered trays were used only to punch into finished trays that in some way exhibited the same type of two row by six column configuration as that of the clustered tray.

Yet another problem associated with the conventional method of using a punch machine to transplant propagules (and/or propagule plugs) has to do with the design of the propagule punch pins (or, more generally, the plant punch elements). In particular, plant punch elements are conventionally designed to have the same shape, length, plant punch element head surface shape (as but a few parameters). As has been determined, certain variations of certain parameters have been found to improve yield when the variations are prudently made for a certain species and transplant modality (e.g., transplantation for growth in a certain geographic location). Use of conventional punch plant elements, when compared with use of the modified punch plant elements disclosed herein, result, e.g., in an increased damage to the transplant propagule or plant, which in turn compromises yield. Propagules often suffer impact and compression injuries and associated damage upon receipt of the force imparted by the plant punch element during a transplant punch event. A related problem stems from the flat, planar nature of the surface of the punch element head that first contacts the plant and/or the growth medium (e.g., soil) in which the plant is situated. Too often, the direct, non-diverting nature of the impact causes unacceptably high amounts of crushing damage to the transplanted plants. However, there appears to have been no attempt to modify the plant punch elements (or the manner in which they are used) from conventional design and practice in any manner in order to improve, e.g., yield or survivability of the transplanted propagule. Further, even if there were options in the design or use of plant punch elements, conventional plant transplanters (such as plant punch machines) provide no allowance for interchanging by a user of one punch element with another punch element having a preferred design for an indicated species and transplant modality.

One type of transplanter that was developed to push the seedling and seedling rooting media through the bottom of the seedling tray into a larger container or tray is noted in U.S. Pat. Nos. 3,799,078 and 3,820,480. In these punchdown methods the seedling is punched through the bottom of the seedling tray into the new larger container or tray. These mechanical transplanters improved the efficiency of transplanting labor, but because of the mechanical aspect of the machinery and the like, there has sometimes been a reduction in the yield of seedlings when transplanted into larger containers and within the larger containers. Some seedlings may have been too small or too large to be successfully transplanted using a mechanical transplanter. This may have resulted in greenhouse operators purchasing seedlings that cannot be used, thereby decreasing the yields of finished containers to seedlings. Some seedlings may have been transplanted using this method, but because of mechanical damage to the seedling experienced during the mechanical transplanting process, the seedling later dies. This may result in greenhouse operators replacing the dead plant by hand. This can be very labor intensive and cost inefficient. Sometimes, the greenhouse operator may need to discard the product because it is not salable. This reduces the yield of the expected finished containers. Greenhouse production costs often exceed 70% of the overall product costs. Greenhouse operators need to control these production costs. The best way to do that is to increase yields. Increased yields reduce production expenses by reducing the amount of seedlings required to achieve the planned numbers and decreasing labor costs due to efficient transplanting and eliminating the need to replace dead seedlings. Increased yields can also result in increased sales because an increased number of salable containers may be available. As production costs (such as fuel and labor) continue to increase, it can become more critical than ever for greenhouse operators to have higher yields to remain competitive in the market. Perhaps surprisingly, however, greenhouse operators have worked to improve seedlings and the transplanting process independent of those designing transfer systems and methods.

Another type of apparatus is disclosed in each of U.S. Pat. Nos. 5,425,202, 4,616,578, 4,408,549, 4,389,814, 3,712,252 and 3,446,164. However, none of these patents appears to disclose a large number of propagule containers that is operationally compatible with a numerically significant number of alternative adolescent plant tray configurations, as but one patentably significant feature.

One problem that greenhouse operators struggle with is that seedling producers have not previously been producing seedlings specifically grown to be transplanted with a mechanical transplanter. Seedling producers have historically focused on seedling production for maximum germination, minimum time in the seedling tray and best quality seedling for transportation to the customer who may also do transplanting. On the other hand, transplanter manufacturing companies have historically focused on designing transplanters that transplant the seedlings very fast. The two areas have simply not been as coordinated as they could. For example, one of the problems with this punch-down method of transfer is that the seedling can often be put under pressure as it is punched down through the seedling tray and into the new larger container's media as shown in U.S. Pat. Nos. 3,799,078 and 3,820,480. This method uses a very small cell for the seedling, which can result in the transfer of an immature seedling with a small root system in a small amount of rooting media. Because of the extremely small size of the individual cells, the seedlings can often be damaged during the punch out process. During the punching down process, the plant usually must fit through the opening at the bottom of the individual cell. Because of the high-density number of cells per tray, seedling leaves can be damaged because they do not often fit properly though the very small cell. This damage to the seedling can provide a wound for disease or insects, which can reduce the vigor of the transplanted plant or even cause death. The seedling's roots and media may be punched (or forcibly punched) into the new larger container's media potentially resulting in tearing and crushed roots. Torn and crushed roots allow disease and insects a point of entry, which may reduce seedling vigor and may lead to death of the seedling in the new, larger container. Further, the amount of rooting media is often extremely small. Because of the small amount of media usually available for the seedling to root into, the root system of the seedling is often small and fragile and therefore subject to tearing or damage that may provide a wound for disease or reduce the overall root volume available to support the plant. Healthy roots are critical to high yields after transplanting. Seedlings with damaged, diseased roots usually have reduced vigor and increased mortality rates. All this may require the greenhouse operator to replace the dead plants or discard the container as unsalable. This may also cause the cell size of the seedling to be very small (and thus immature) so that the amount of root and rooting media being punched down so that compression is minimized. Small, immature seedlings have a higher mortality rate—often as high as 10–15% depending on variety of seedling—which dramatically reduces the transplant yield and increases production costs.

To compound the situation, the number of individual cells in the seedling tray is not usually coordinated with the number of cells in the larger container. Sometimes the seedling tray and larger container may often not be compatible, resulting in leftover seedlings that may either be thrown away or may need to be manually transplanted. During the transfer process there may be seedlings that are leftover without a finished container in which to be transferred or there may be finished containers without seedlings because the seedlings are used up before the finished containers are done being transplanted. This may require greenhouse operators to either discard the left over seedlings or to discard the finished tray that is not completed causing additional expense in seed, growing media, trays, labor, greenhouse space, and overhead to manage product that will be discarded.

Another problem is that the leaf area and leaf type of the seedling may not be coordinated with the mechanical aspect of the transplanting process. This could result in a significant number of torn or damaged leaves on the seedlings as the transplanter transfers the seedling from the small cell to the larger container. This tearing or damage of the leaf may create a point of entry for disease, or reduces the vigor of the seedling by reducing the photosynthesis area so it either is stunted or dies in the larger container. This may also reduce yields.

Another potential problem with the system described in U.S. Pat. No. 3,799,078 and U.S. Pat. No. 3,820,480 is that the ratio of the head of the punch-down device can be too large for the cell dimensions. This can result in the punch head hitting the seedling and punching down on top of the seedling. This action may result in crushing and breaking of leaves and stems of the seedlings as it is punched down through the cell into the larger container or tray. The head of the puncher can sometimes be over 50% of the size of the cell thereby assuring that the punch head will come into contact with the seedling's leaf or stem. As mentioned, crushed or broken leaves or stems may allow disease and insects at a point of entry which can reduce seedling vigor and may lead to death of the seedling in a new, larger container. This can require the greenhouse operator to replace the dead plants or discard the container as unsalable.

Another problem with the puncher head described in U.S. Pat. No. 3,799,078 and U.S. Pat. No. 3,820,480 may be that the puncher head may have a concave face. This may exist so the device in direct contact with the seedling's leaf and stem has a face that encourages the seedling to become situated directly under the puncher head. This may significantly increase the likelihood that the puncher head will break or crush the leaves and/or stem of the seedling being transplanted.

SUMMARY OF THE INVENTION

The present invention includes a variety of aspects that may be selected in different combinations based upon the particular application or needs to be addressed. In one basic form, the invention discloses an operational system of a punch-down transplanter that may increase the transplant yields by addressing problems previously identified. At least one embodiment of the invention discloses a propagule container tray that is areally continuous and exhibits an unclustered arrangement of propagule plug containers (or propagule transplant containers). The configuration (defined to include the number of) of these containers enables operationally compatibility with a numerically significant number of alternative adolescent plant tray configurations, meaning that each of the new propagule transplant tray configurations can be used in a propagule plug punch machine to punch into a numerically significant number of alternative adolescent plant tray configurations. The term alternative adolescent plant tray configurations refers to adolescent (or finished tray or output tray) configurations (such as, e.g., the 6-06 tray) that have different numbers of adolescent plant tray containers, and/or that exhibit different patterns of adolescent plant tray containers (e.g., a different number of rows and/or columns), and/or that are different in dimension (e.g., length or width). The terms operationally compatible and numerically significant are defined later in the specification and claims.

The invention also provides for a consultable collection plant transplant process system (that may include, e.g., printed documents arranged in binder or book, or an electronic database as stored on a computer, as but a few examples) comprising plant transplant process information that may be usable by a nursery, e.g., to improve efficiency of the plant transplant process. Essentially, this consultable collection plant transplant process system could contain a collection of information items (pieces of information) such as, e.g., a recommendation, suggestion, advisement, conclusion (or merely just information generally) regarding the compatibility of a certain propagule container tray configuration with at least one of several adolescent plant tray (or finished tray) configurations. This consultable collection may also include a selection advisement as to the optimal propagule punch structure to use for a certain propagule transplant container configuration/adolescent plant tray configuration combination. This information can be used by, e.g., a nursery manager or operator, or greenhouse manager or operator to improve transplant process efficiency. Naturally, as a result of these several different and potentially independent aspects of the invention, the objects of the invention are quite varied.

The invention also provides for a plant punch element that may be detached by a user so that a plant punch element (such as a punch pin) having a design (or enabling a use) appropriate for a certain transplant modality may be inserted into the plant transplanter by a user in order to increase transplant yield with respect to that modality. The invention also provides for a unintrusive plant-divergent plant punch element that, upon operation of the plant transplanter, mitigates damage, e.g., as by crushing, that conventional punch transplanters cause to plants such as propagules during the punching process.

Another broad goal of the invention is to allow for an enhanced operational compatibility breadth of a propagule plug punch machine system (may include various propagule plug punch pin structures (or more generally, plant punch element assemblies) and one of at least two propagule plug trays) without compromising (and indeed, perhaps improving) the yield of the transplanted plants. A related goal of the invention is to utilize the concept of off-center punching in order to achieve an enhanced operational compatibility breadth of a propagule plug punch machine system without compromising yield of the transplanted plants.

Another broad goal of the invention is to provide a consultable collection plant transplant process system that may be a consultable collection of plant process information utilizable, as by consultation, e.g., by a plant transplanter (or by a nursery or greenhouse operator, e.g.) to improve the efficiency of the transplantation process, and thus of the nursery or greenhouse business.

One of the broad objects of the invention is to allow for an improvement in the overall efficiency of the nursery business by improving the efficiency of the transplanting process. A related goal is to allow for the seeding of a sufficient number of trays (sufficient to meet forecasted demand) of any of the inventive technology's propagule plug tray configurations without incurring the substantial risk of investment losses that otherwise might occur (i.e., in a traditional transplanting system) if demand for a certain adolescent tray configuration is other than that demand forecasted. A related goal is to minimize the number of propagules (or propagule plugs) that need to be hand transplanted into adolescent plant containers. A related goal is to preclude the unavoidable transplantation errors that occur when individuals transplant propagules (or propagule plugs) by hand.

Another broad goal of the invention is to improve the yield and/or survivability of punch transplanted propagules. A related goal is to provide to the user of the plant punch machine a selection of differently designed and/or differently usable plant punch elements, from which the punch machine user (or a greenhouse or nursery operator) may prudently select in order to optimize yield for a given transplant modality. A related goal is to provide plant punch elements that are user-detachable, enabling use of punch elements having a design or suited for use for a certain transplant modality, thereby facilitating an increase in transplant yield. A related goal is to provide a plant punch element that can somehow minimize or at least reduce the amount of crushing impact damage suffered by plants during the punch transplant process.

Another aspect of the invention may include the location of the seedling in the cell of the seedling tray and the punch head shape to accommodate that location. In one embodiment, the seedling in the cell of the seedling tray may be located in a specific quadrant of the cell. This may be accomplished with exact placement of the seed during the seeding process. The punch head may then be shaped to punch the remaining one to three quadrants of the seedling cell. The ratio of the punch head to the remaining cell area could be 25%, 33%, 50%, or even up to 80%. By specifically locating the seed in the seedling cell, the seedling may have the correct cell area in which to mature. Further, the punch head may not come into direct contact with the seedling stem during the punching process. Because the punch head may now be in contact with the media in the seedling cell and not in direct contact with the seedling stem, the size of the punch head can be increased to insure a more consistent and complete punching of each seedling. Thus, more seedlings may be transferred from the seedling tray to the larger finished container or tray. Damage to leaves and stems may be reduced resulting in a healthier seedling being transferred to the larger container and tray. This process may result in increased transplant yield and reduced production costs.

Another goal of the invention may be to further reduce any damage caused by the punch head in the event it comes in contact with the seedling. The shape of the punch head can be changed from concave in shape (thereby forcing the seedling under the punch head) to a slightly convex shape or even include a kidney shaped cutout. This new shape may even cover the remaining three quadrants of the seedling cell without covering the quadrant with the seedling growing in it. Thus, the seedling stem may not come into substantial contact with the punch head as it is lowered for the punching process onto the seedling cell. This may be accomplished while still applying the correct amount of pressure to punch the seedling through the seedling tray and into the larger container or tray. In one embodiment, the kidney shaped cutout can be blunt so as not to penetrate the rooting media or seedling stem, thus avoiding stabbing or sticking the roots and stems causing damage.

Another aspect of the invention may be to increase the number of seedling trays and finished containers or trays that are punched at one time. By punching down multiple seedling trays into multiple larger containers or trays, efficiency can be increased perhaps two or three times per single punch-down action. This may reduce production costs.

Another goal of the invention may be to eliminate the crushing or breakage of the seedling leaves and stems and compaction of the seedling roots. As may be further understood from FIG. 35, the seedling may be located off center or even in a specific quadrant of the seedling cell. The punch head may then descend upon the seedling where the punch head face may miss substantial (e.g., no damage) contact with the seedling leaves and seedling stem due to position or the kidney shape of the punch head. Once the punch head is fully in contact with the media, the punch head face may then put pressure on the media without penetrating the media or damaging the seedling roots. The seedling stem and seedling leaves may not be in substantial contact with the punch head which may eliminate breakage or crushing. This may increase transplant yields because seedlings are not damaged allowing insects and disease to enter and reduce seedling vigor.

Another significant aspect that the invention addresses may be to increase the number of seedling trays and larger container trays being transplanted at the same time as shown in FIG. 4 28. The transplanter may be able to punch multiple seedling trays (e.g., propagule trays) into multiple larger container trays which may result in decreased motions by the transplanter and thus may increase efficiency by two to three times.

Again, it should be understood that all these values may be further varied to coordinate to particular species and customers needs. A key aspect, however, is the possibility of now coordinating the physical aspects of the tray with the requirements of the larger containers that the seedlings may be transplanted into, while taking into consideration the requirements of the seedling before, during and after transplanting and the mechanical characteristics of the transplanter.

Naturally, further objects of the invention are disclosed throughout other areas of the specification and claims.

BRIEF DESCRIPTION OF THE DRAWINGS

Note that each figure shows only what may be possible embodiments and is not intended to preclude variations from what is shown from inclusion in the inventive technology.

FIG. 1 shows the plant punch machine in a partial downward, punching position.

FIG. 25 shows one ratio of the punch head to the cell dimensions.

FIG. 26 shows the location of the seedling (or propagule) in the seedling cell (or propagule container) and how the punch head may descend on the seedling cell without damaging the seedling. FIG. 26D shows a design of the punch head in cross section.

EXAMPLE

Figure 1:
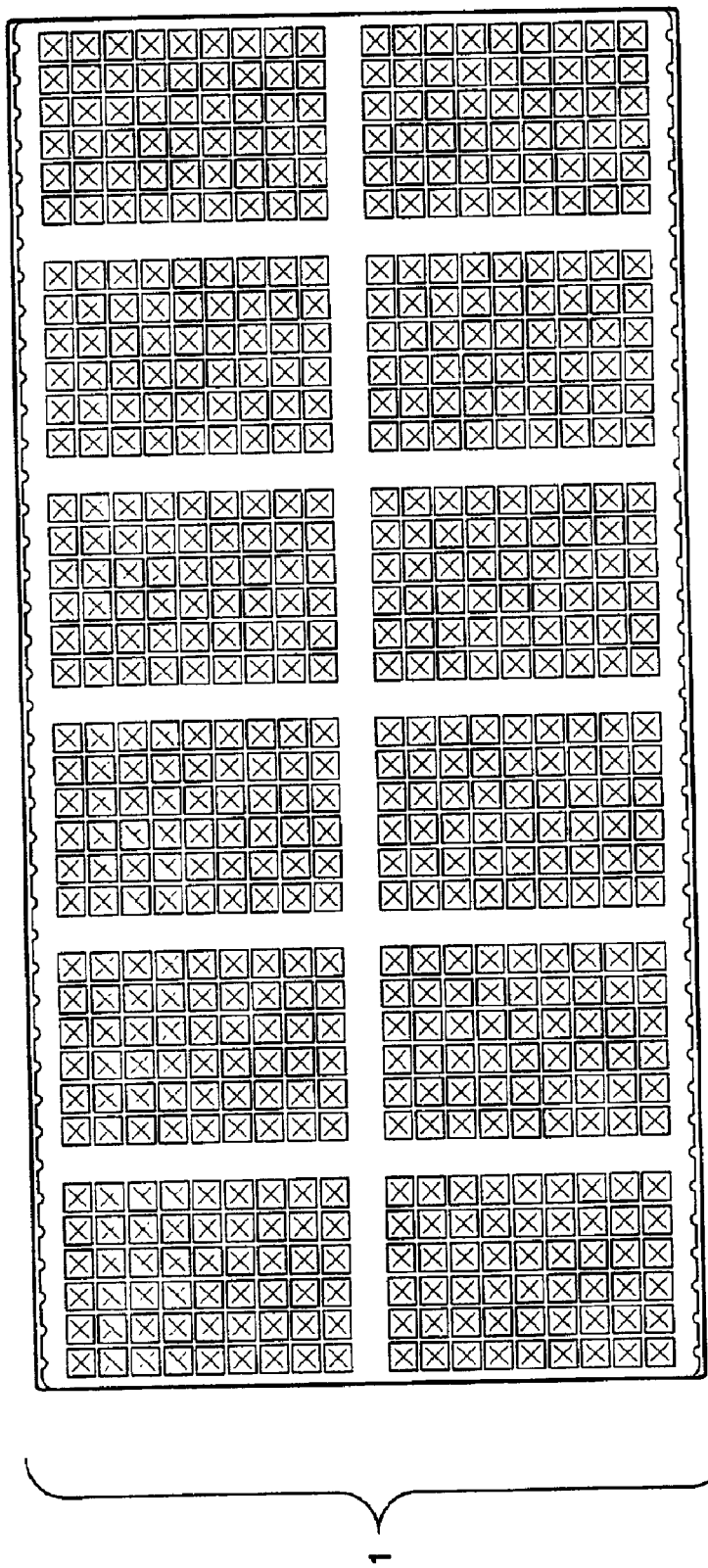
FIG. 1 shows a propagule tray (a two row, six column 12-54 configuration) used in conventional punch systems.
Figure 2:
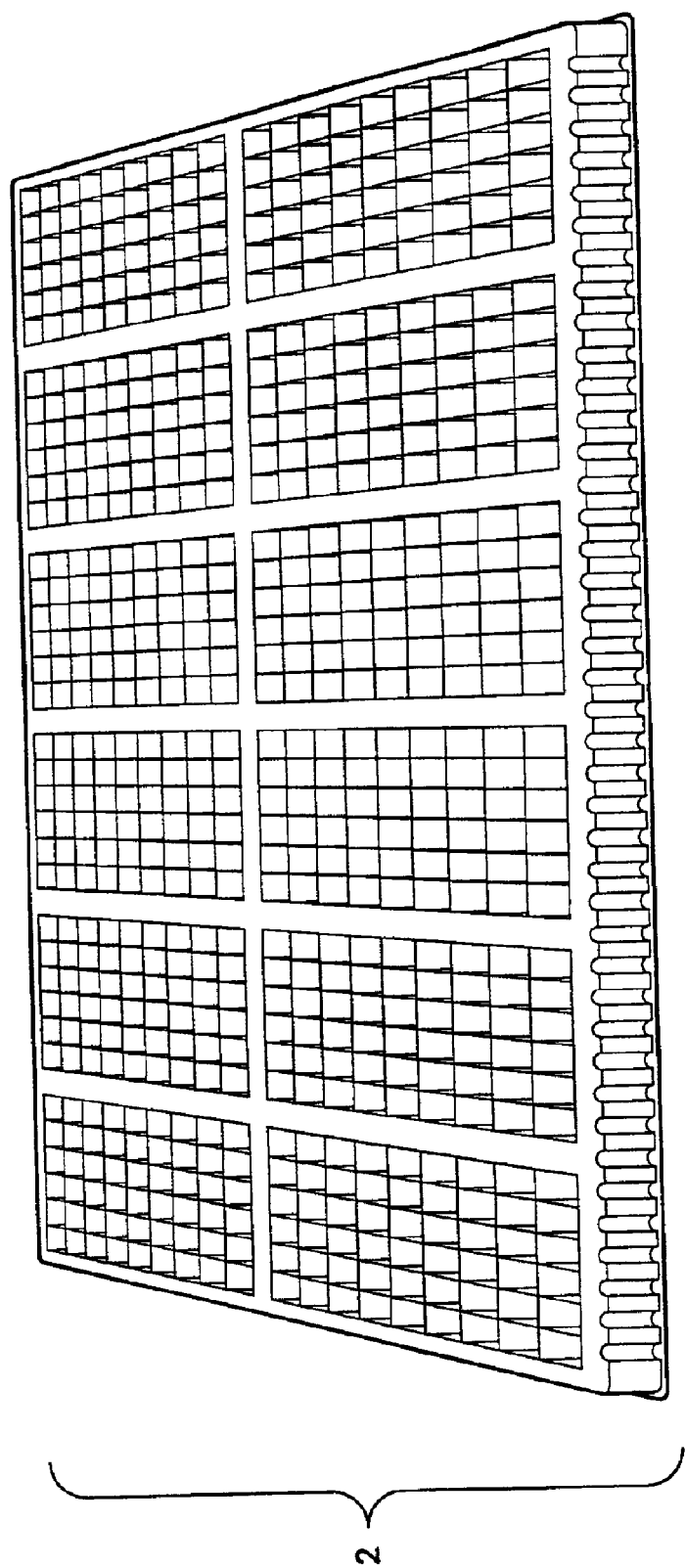
FIG. 2 shows another view of a propagule tray (a two row, six column 12-54 configuration) used in conventional punch systems.
Figure 3:
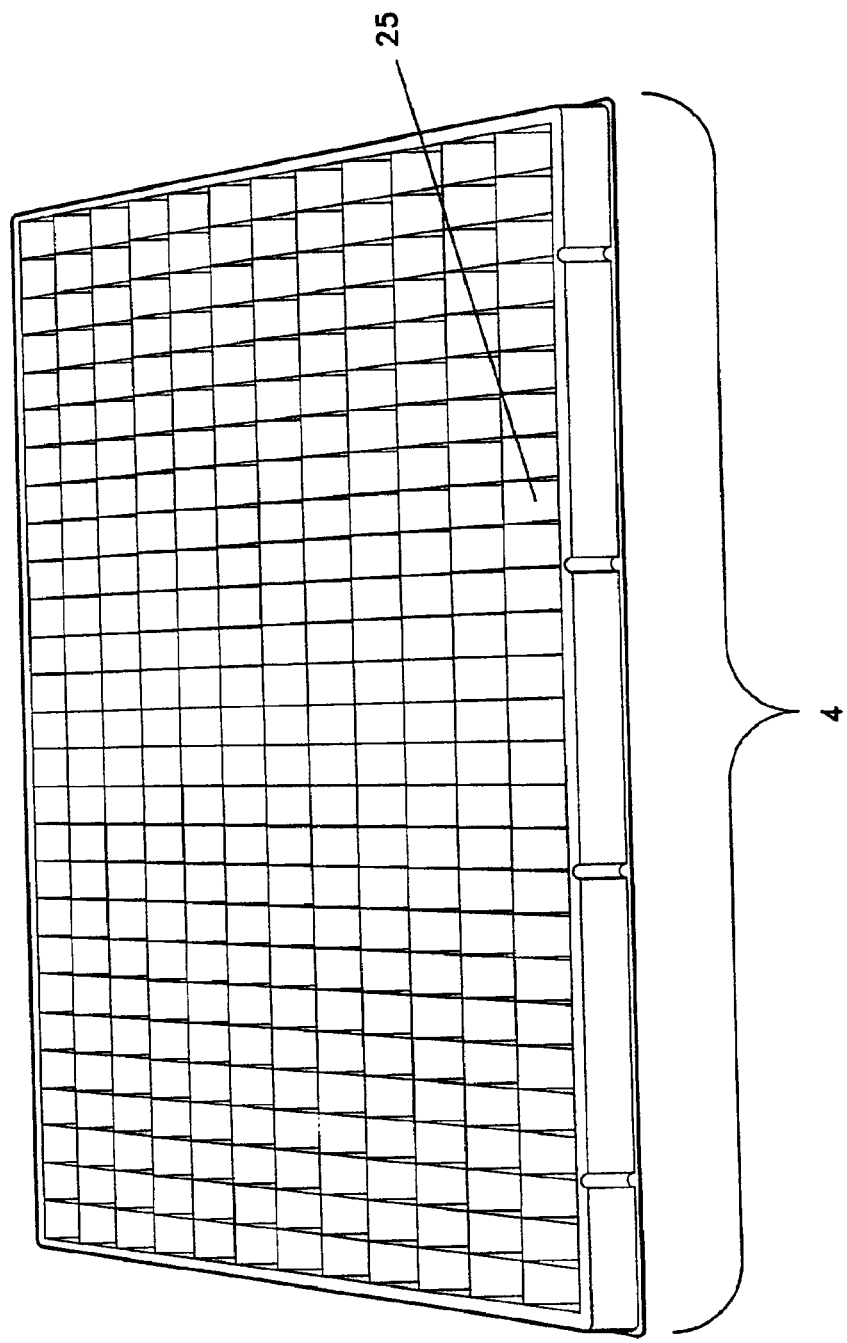
FIG. 3 shows a 324 container propagule tray.
Figure 4:
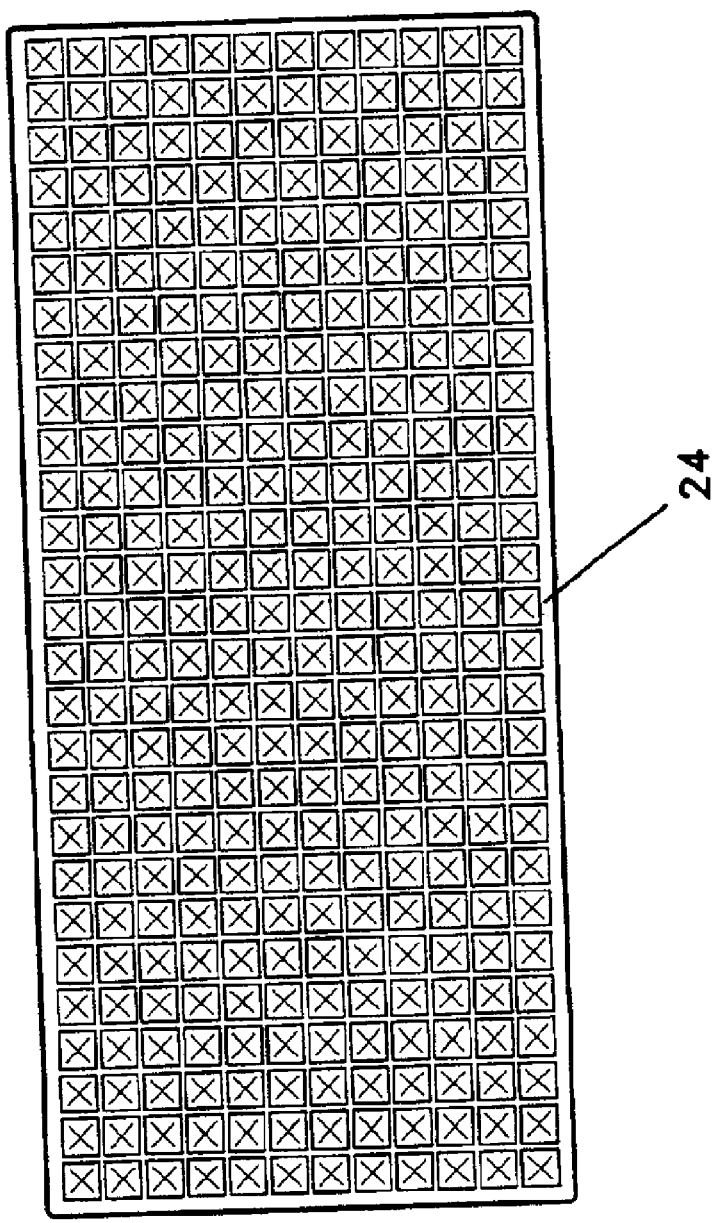
FIG. 4 shows another view of a 324 container propagule tray.
Figure 5:
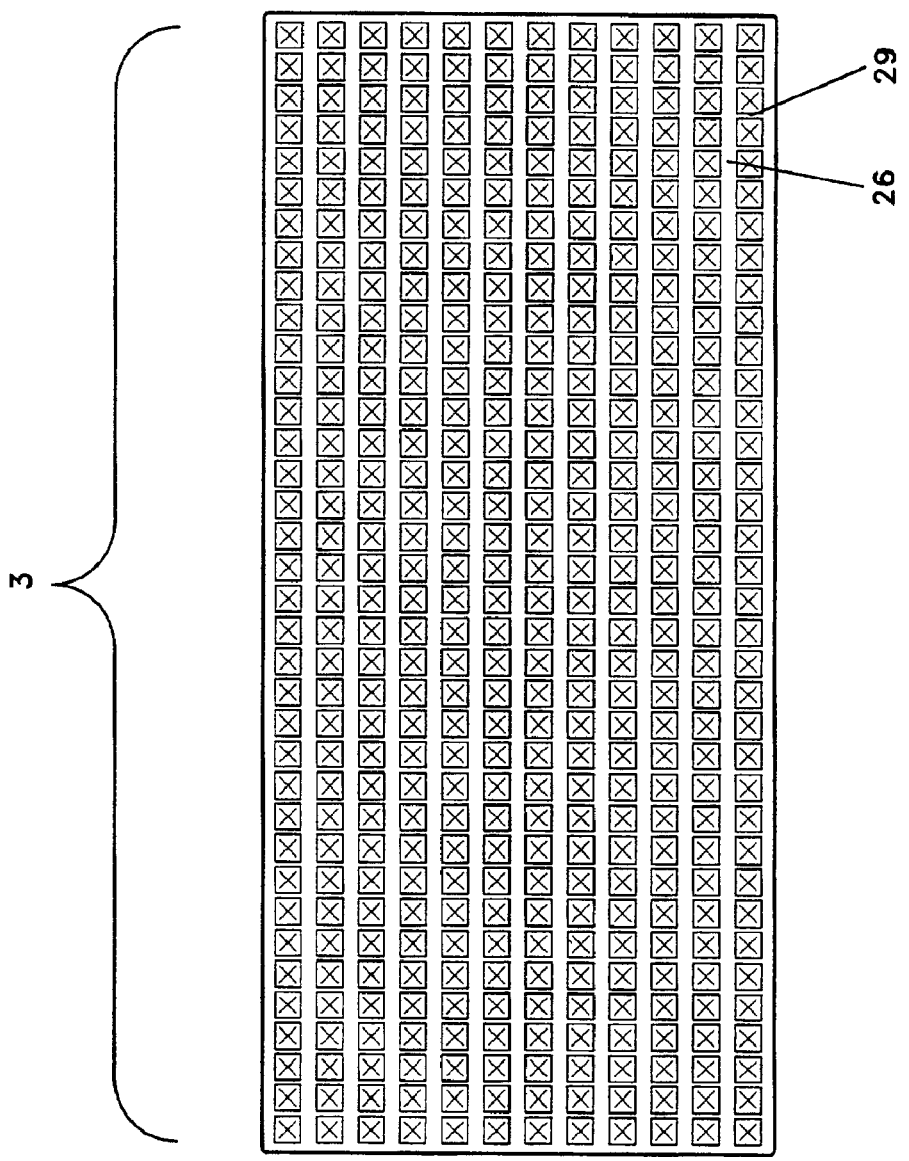
FIG. 5 shows a 432 container propagule tray.
Figure 6:
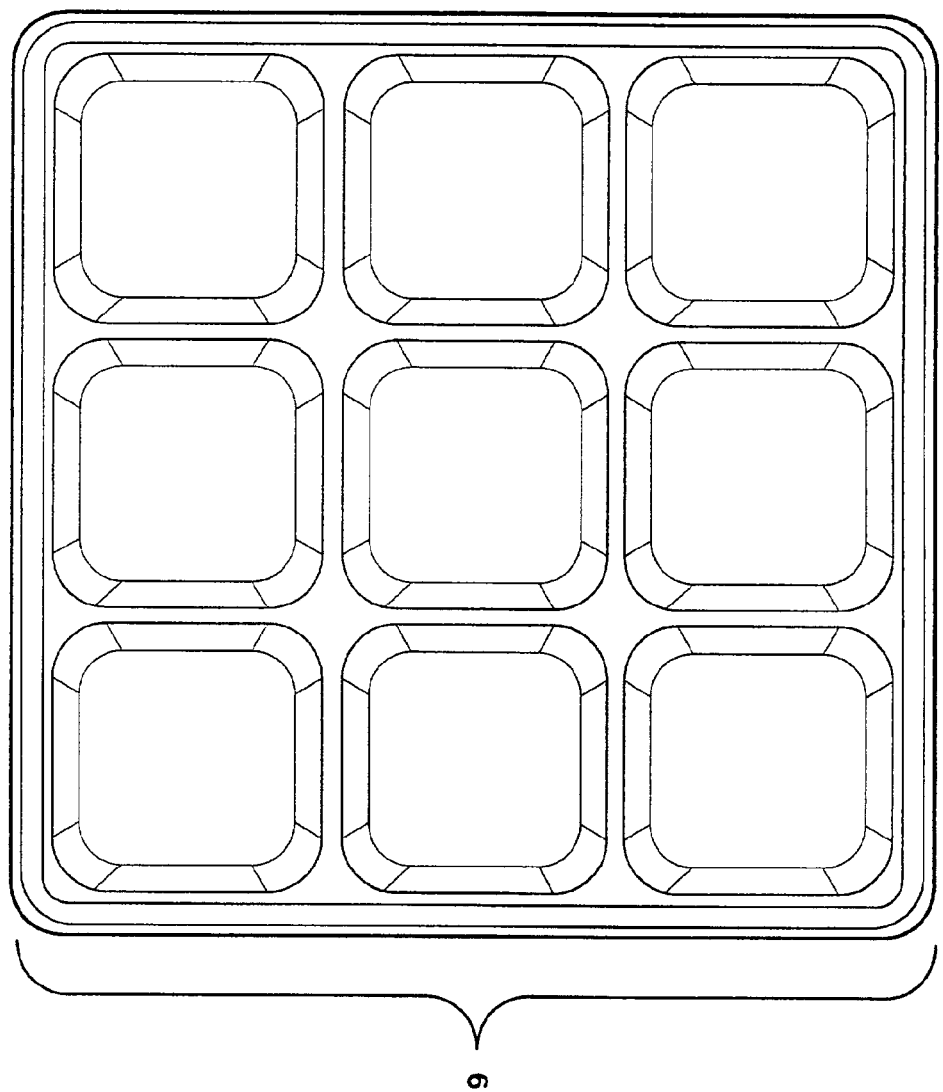
FIG. 6 shows a three by three, 9-01 finished tray.
Figure 7:
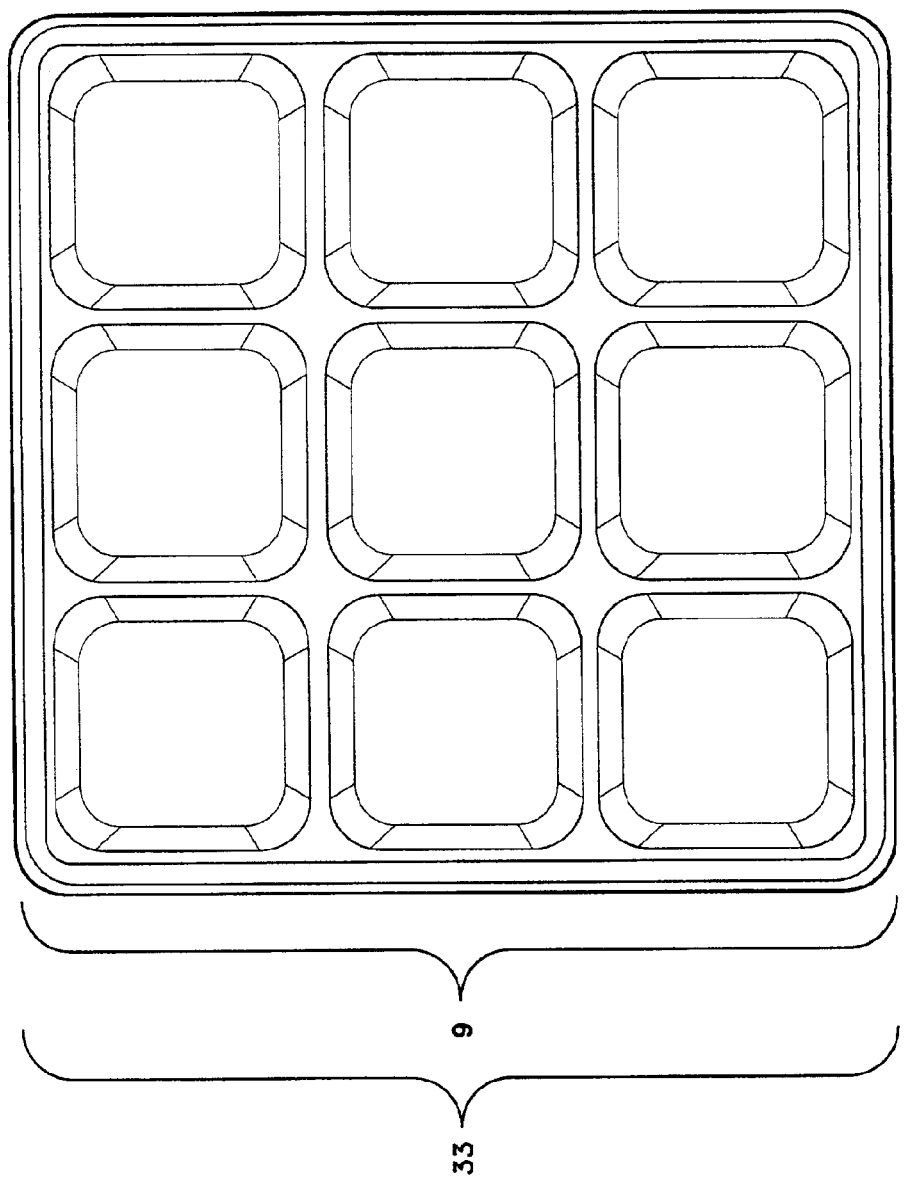
FIG. 7 shows another view of a three by three, 9-01 finished tray.
Figure 8:
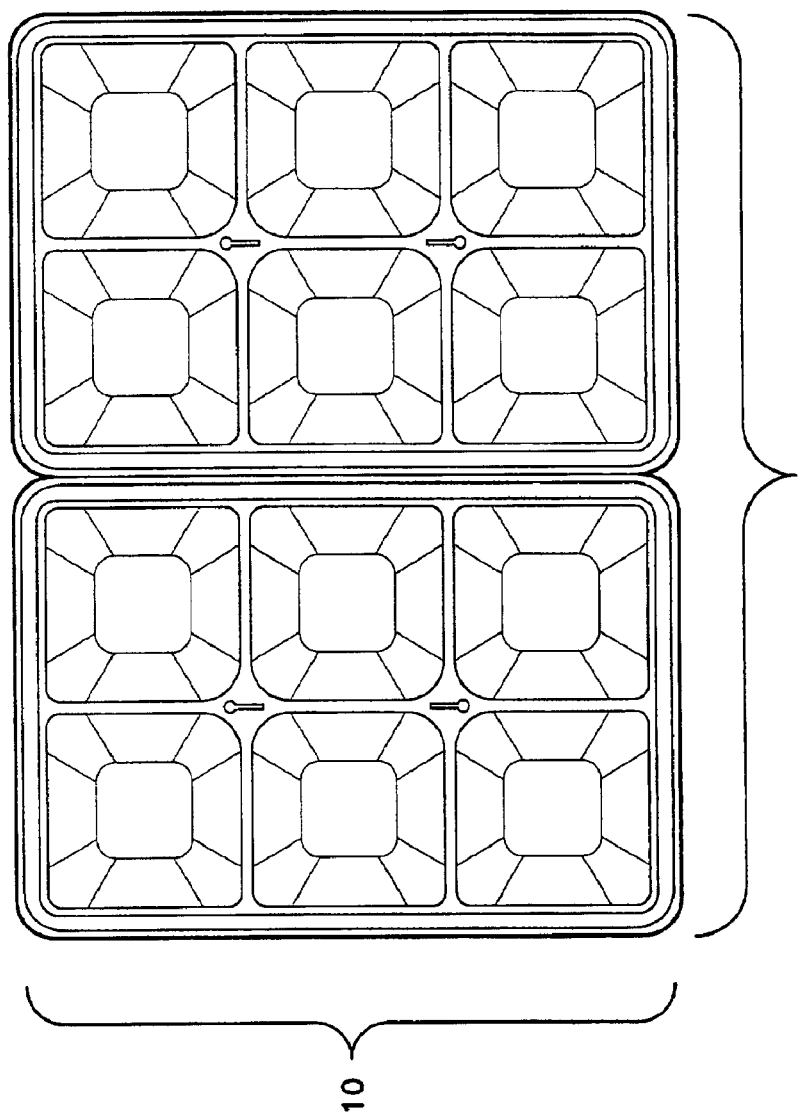
FIG. 8 shows a portion of a two row×three column, 6-06 finished tray.
Figure 9:
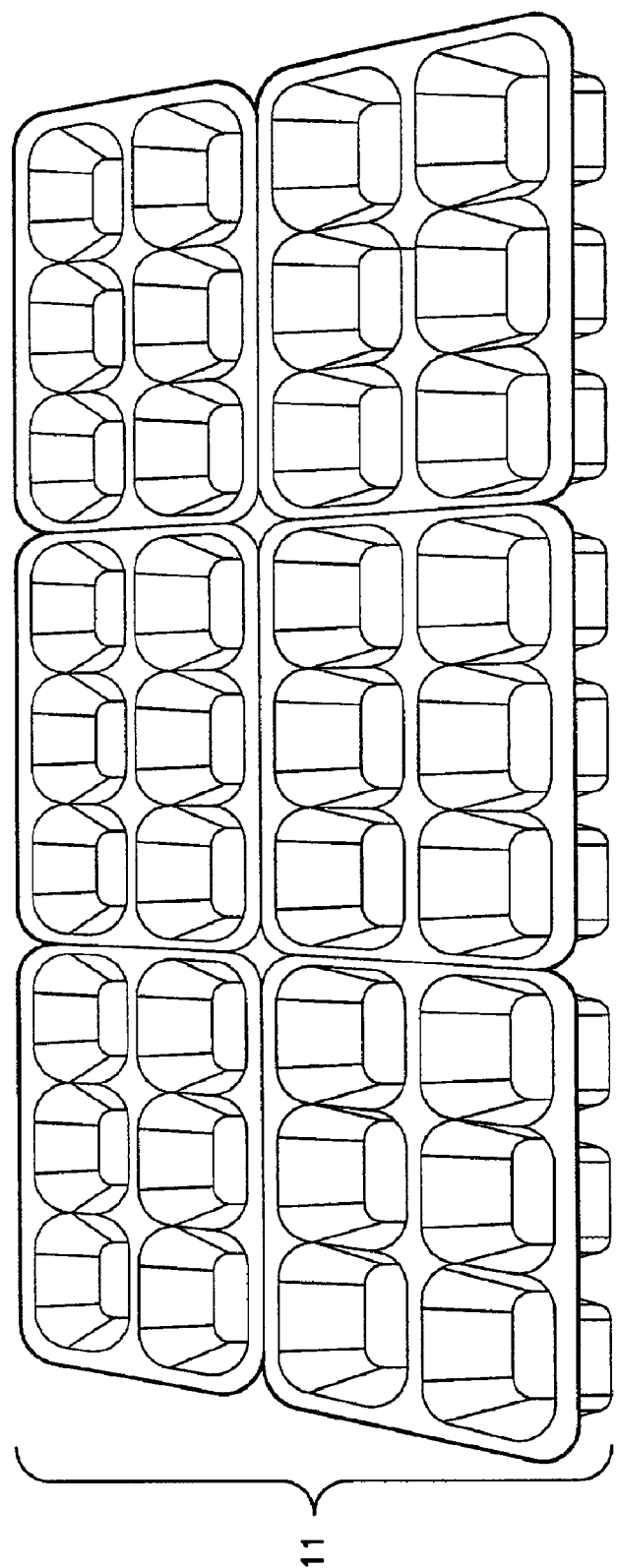
FIG. 9 shows a two row×three column, 6-06 finished tray.
Figure 10:
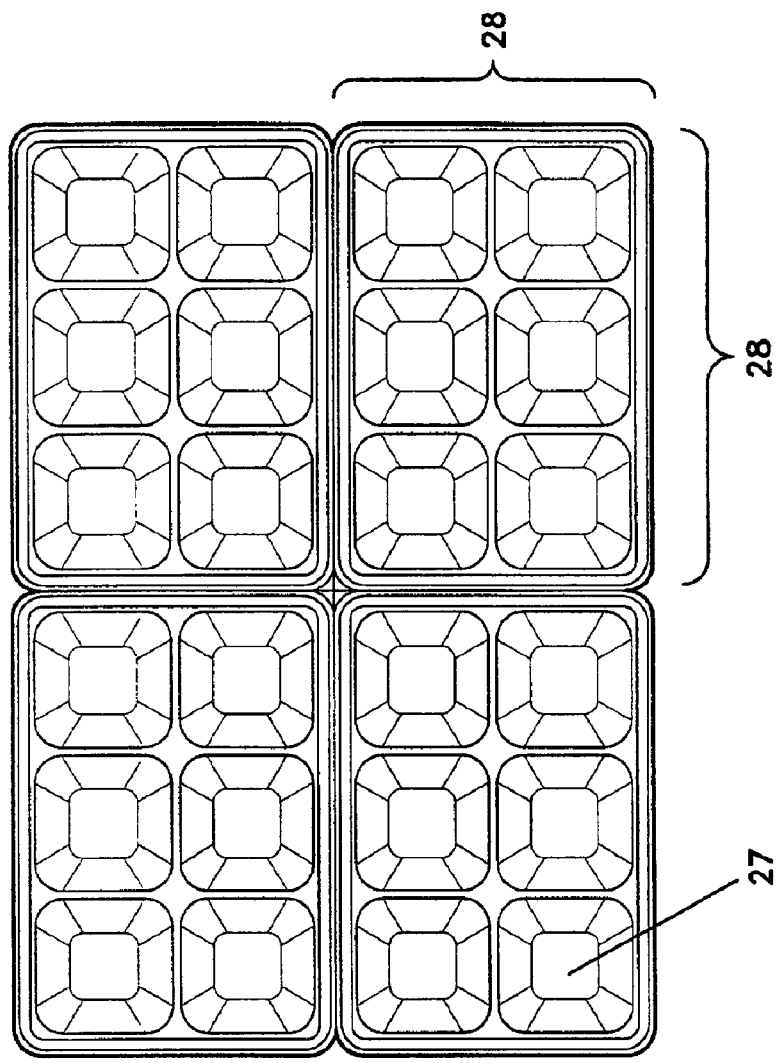
FIG. 10 shows a two by two, 4-06 finished tray.
Figure 11:
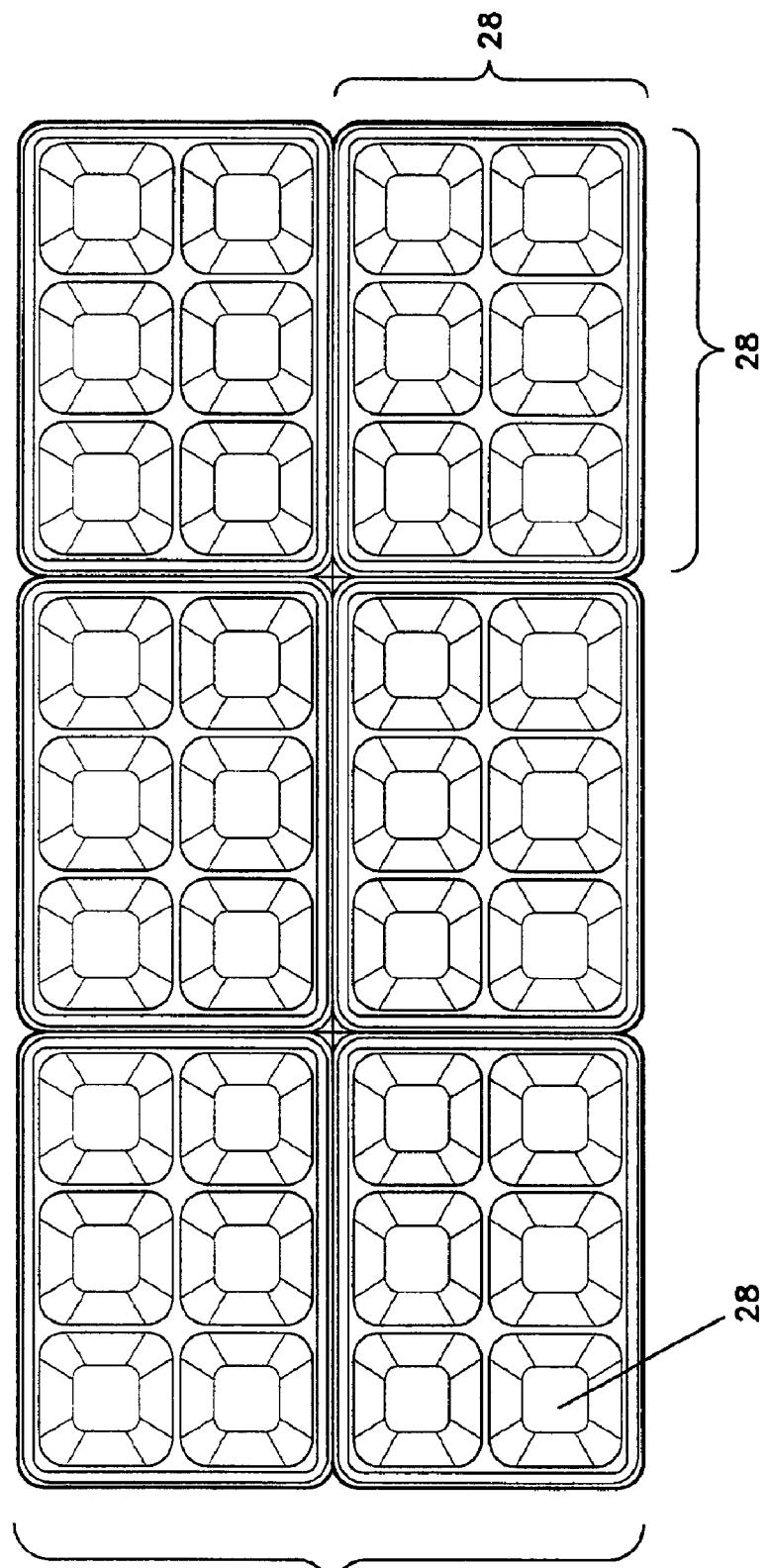
FIG. 11 shows a two row by three column, 6-06 finished tray.
Figure 12:
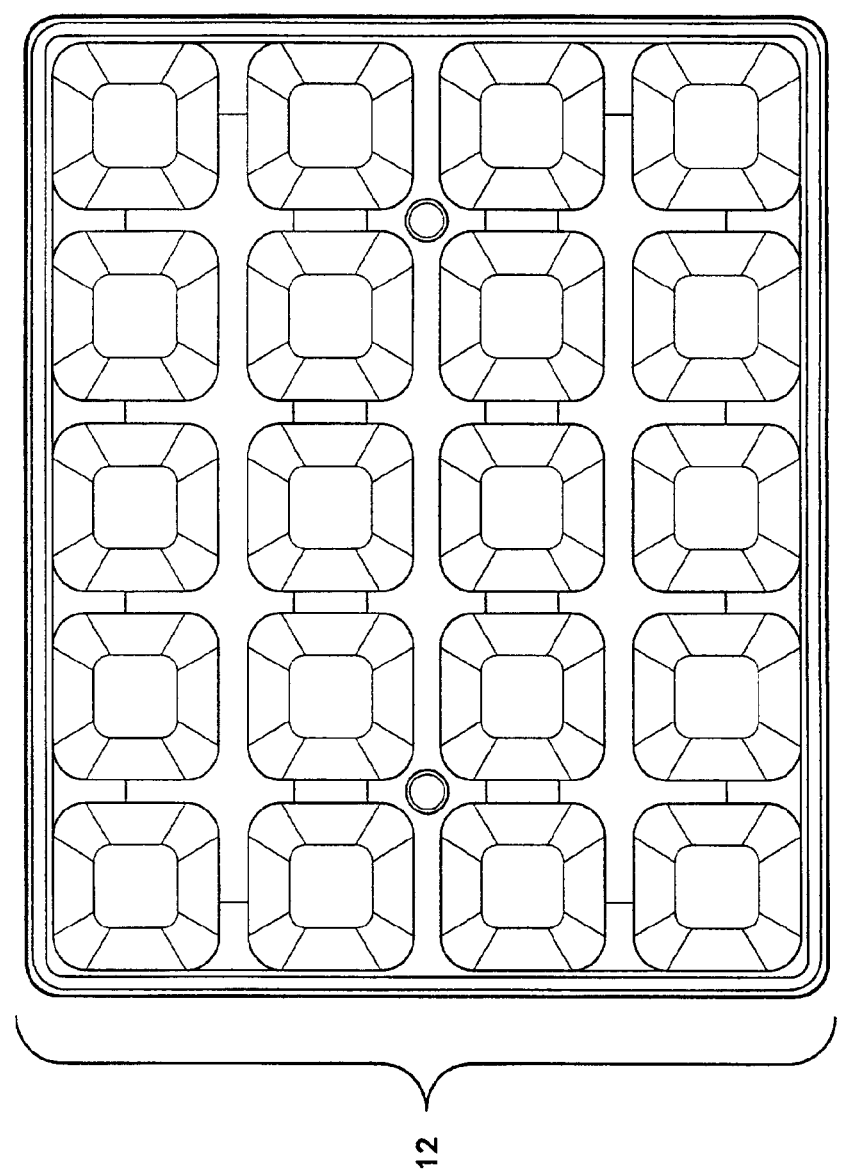
FIG. 12 shows a five by four, 20-01 finished tray.
Figure 13:
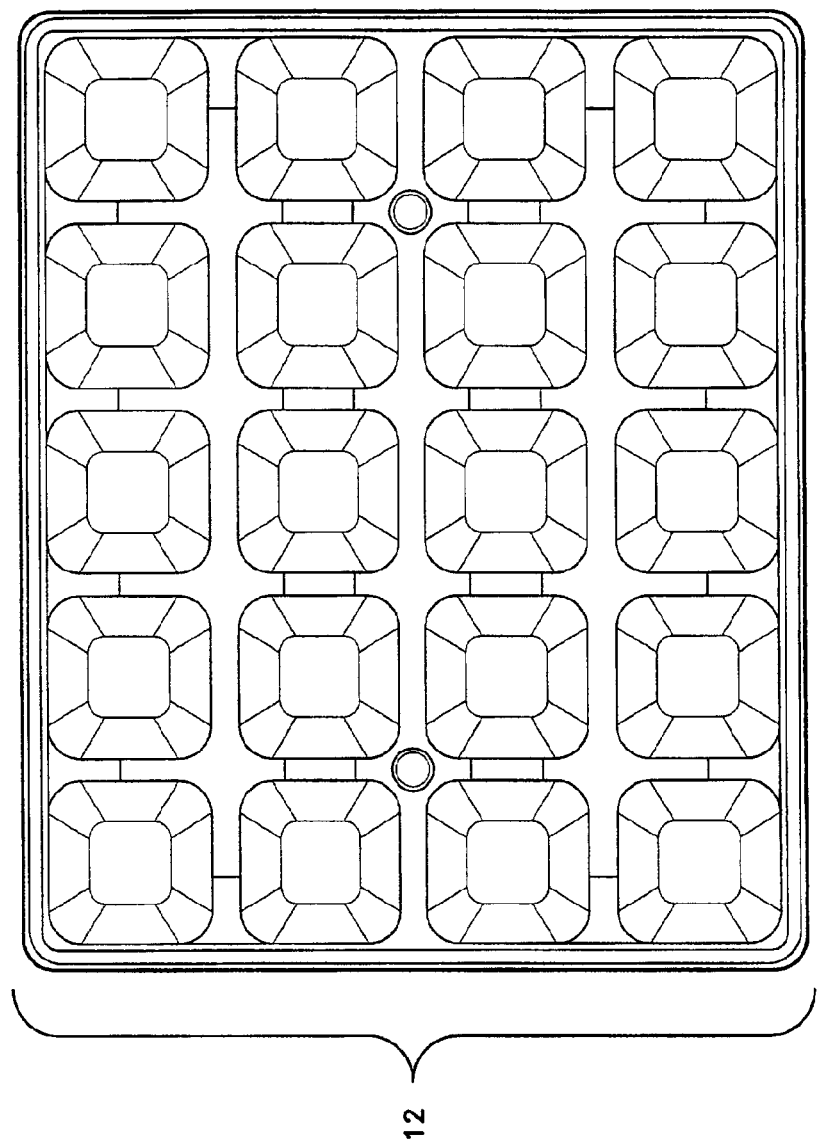
FIG. 13 shows another view of a five by four, 20-01 finished tray.
Figure 14:
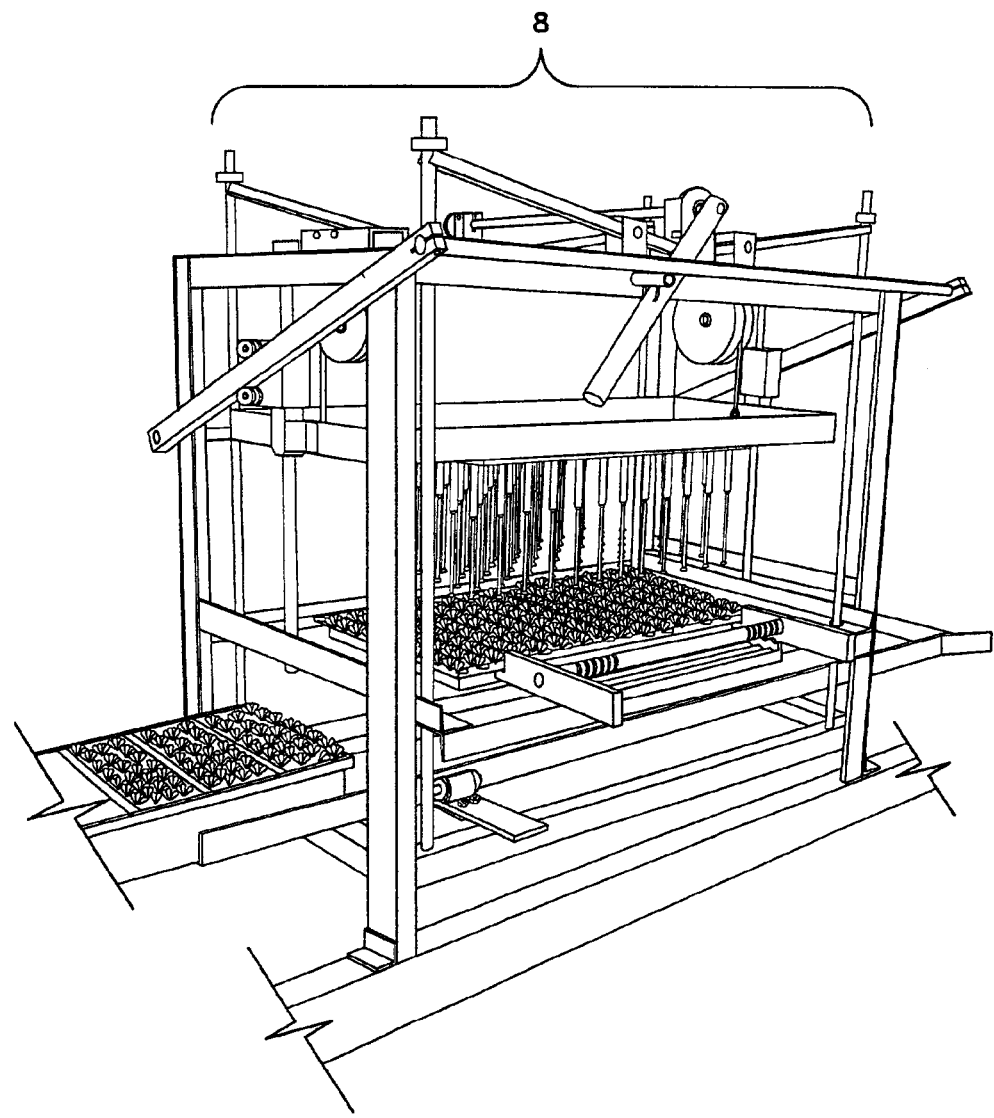
FIG. 14 shows a plant punch machine (a type of plant transplanter) with plant punch elements in a plant punch element assembly and an installed propagule tray.
Figure 15:
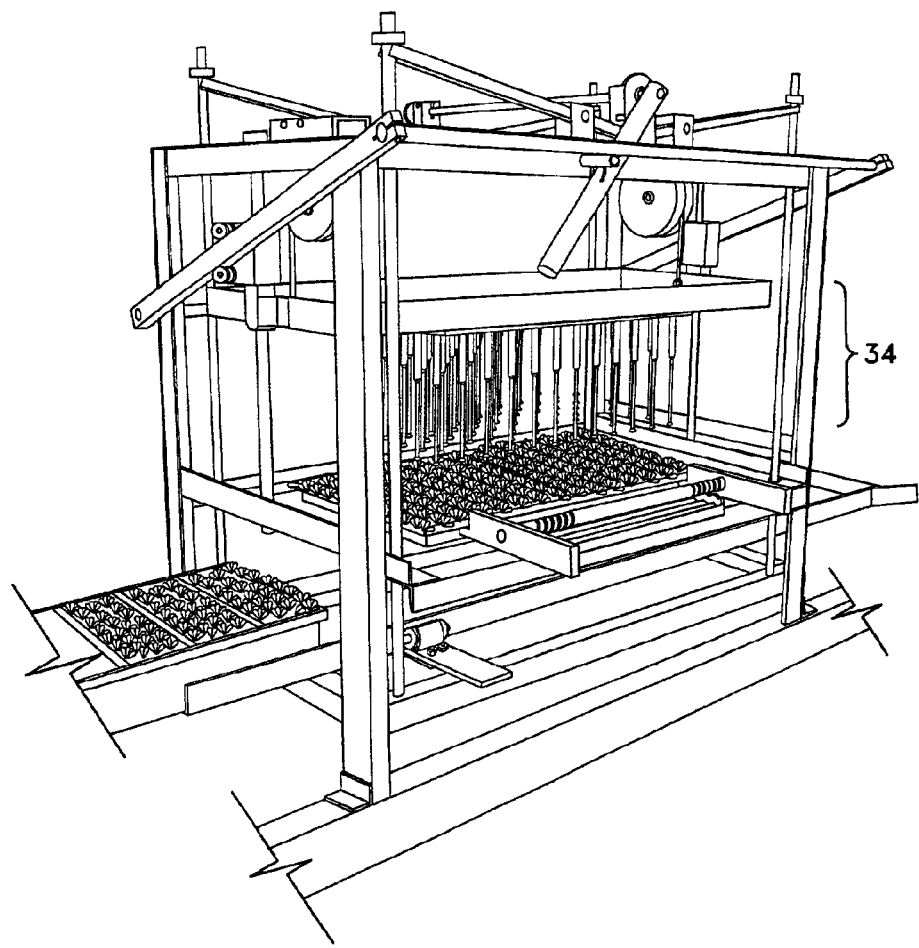
FIG. 15 shows another view of a plant punch machine (a type of plant transplanter) with plant punch elements in a plant punch element assembly and an installed propagule tray.
Figure 16:
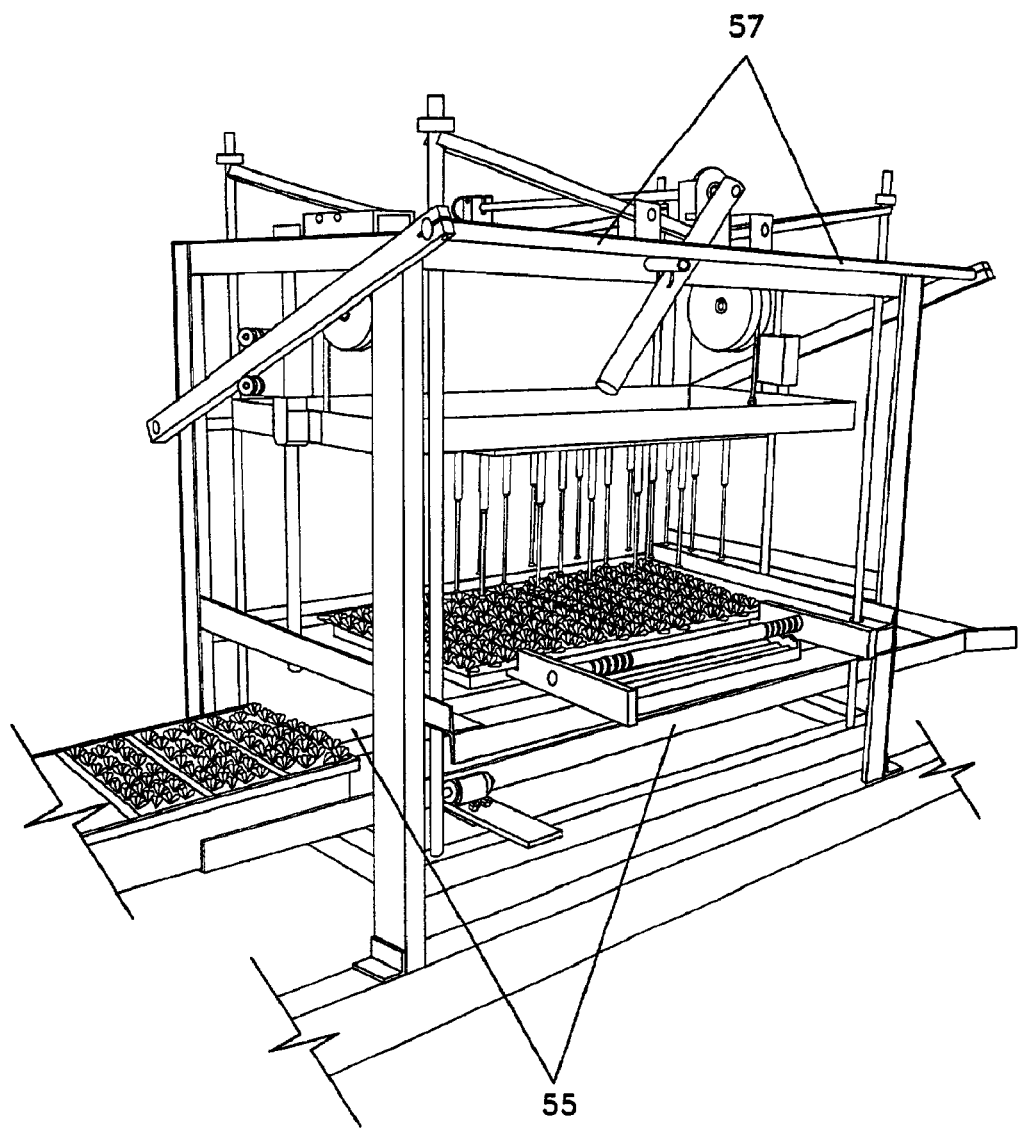
FIG. 16 shows a plant punch machine with plant punch elements in a plant punch element assembly and an adolescent tray in position to receive the punched plugs.
Figure 17:
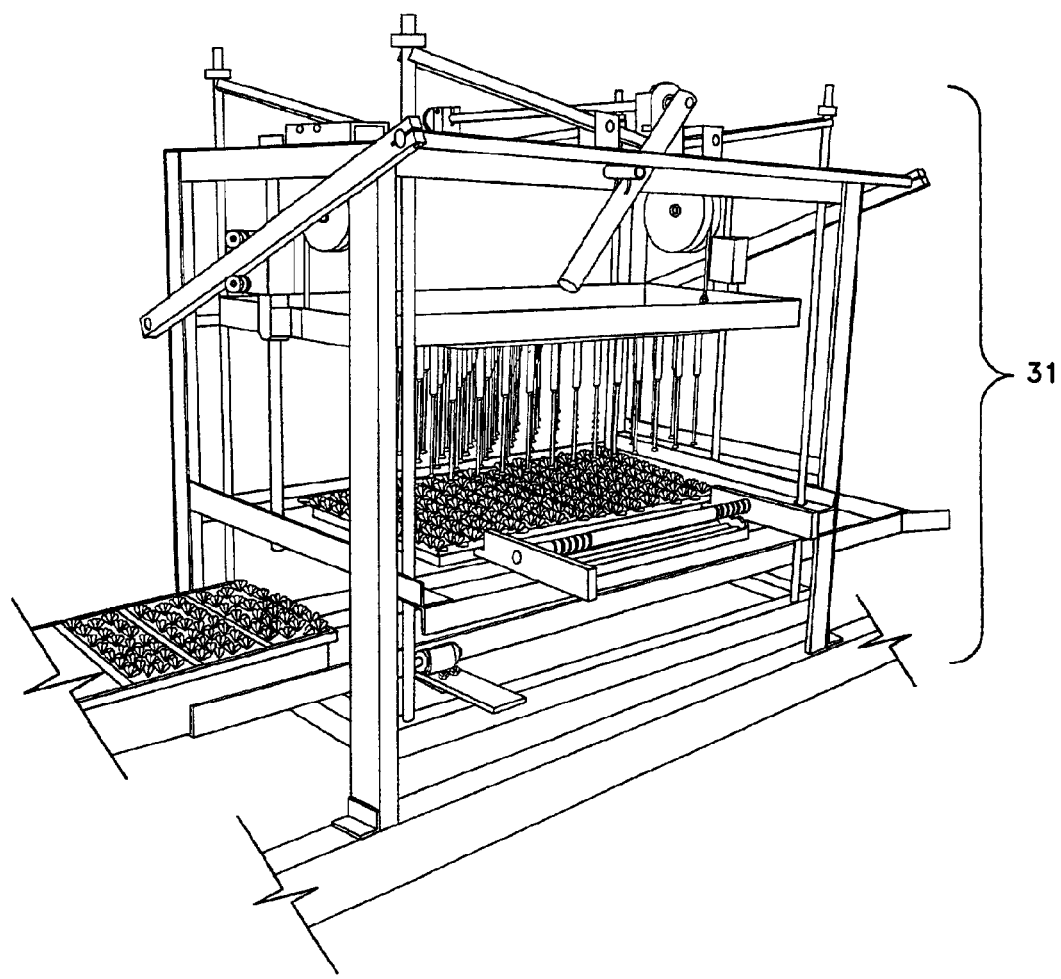
FIG. 17 shows another view of a plant punch machine (a type of plant transplanter) with plant punch elements in a plant punch element assembly and an installed propagule tray.
Figure 18:
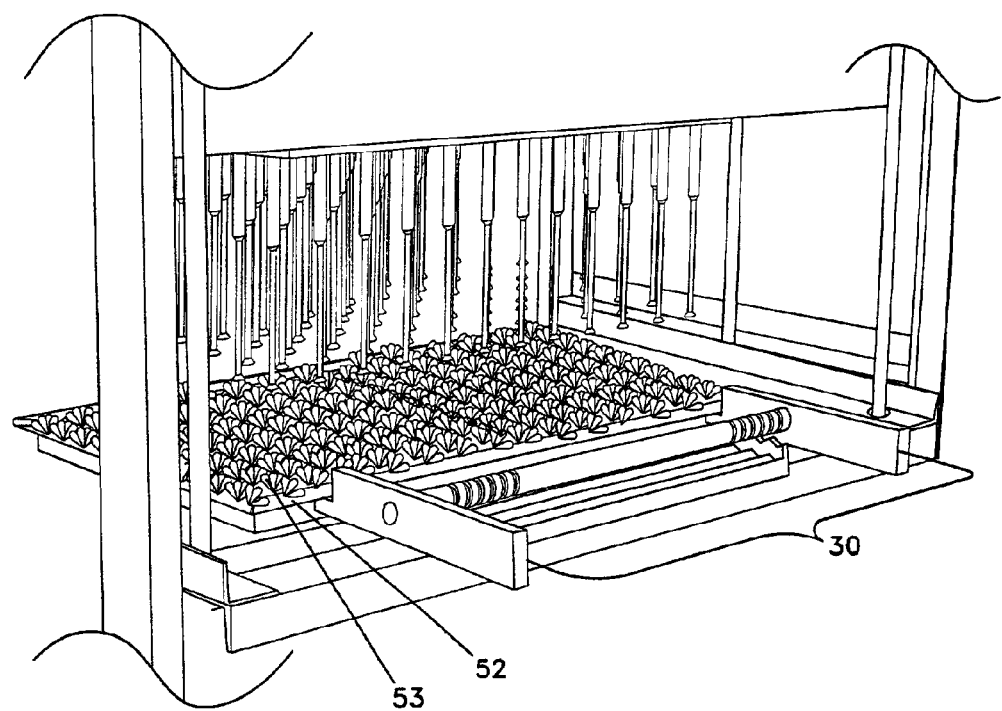
FIG. 18 shows a closeup of the indexing positioning system and the punch elements (part of the punch element assembly).
Figure 19:
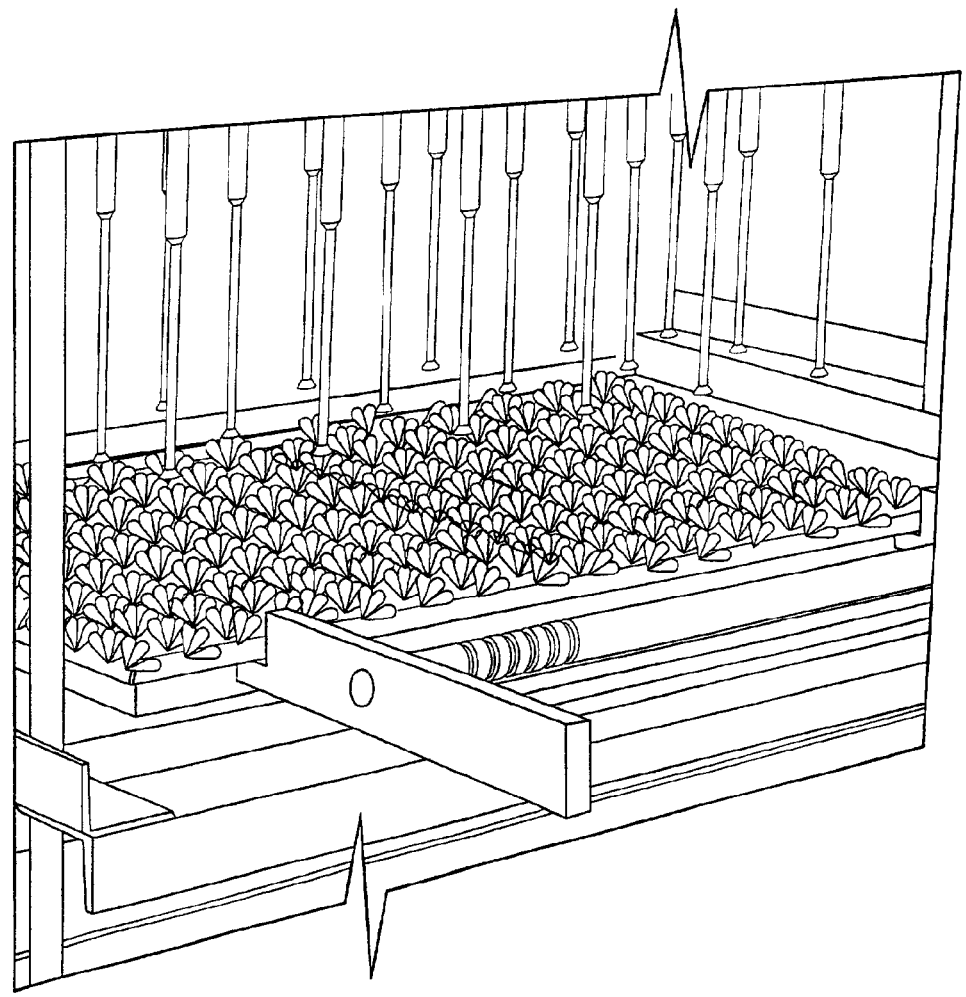
FIG. 19 shows another a closeup of the indexing positioning system and the punch elements (part of the punch element assembly).
Figure 20:
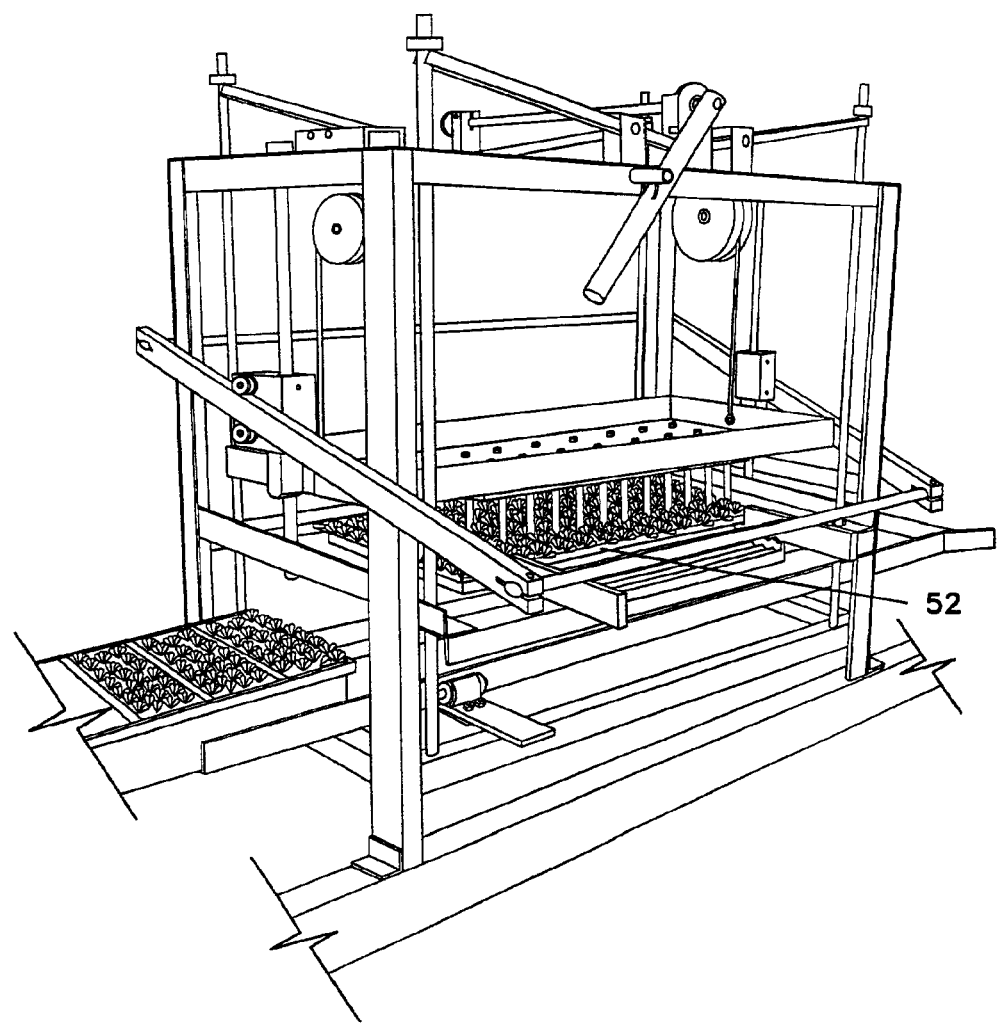
FIG. 20 shows the plant punch machine in a downward, punching position.
Figure 21:
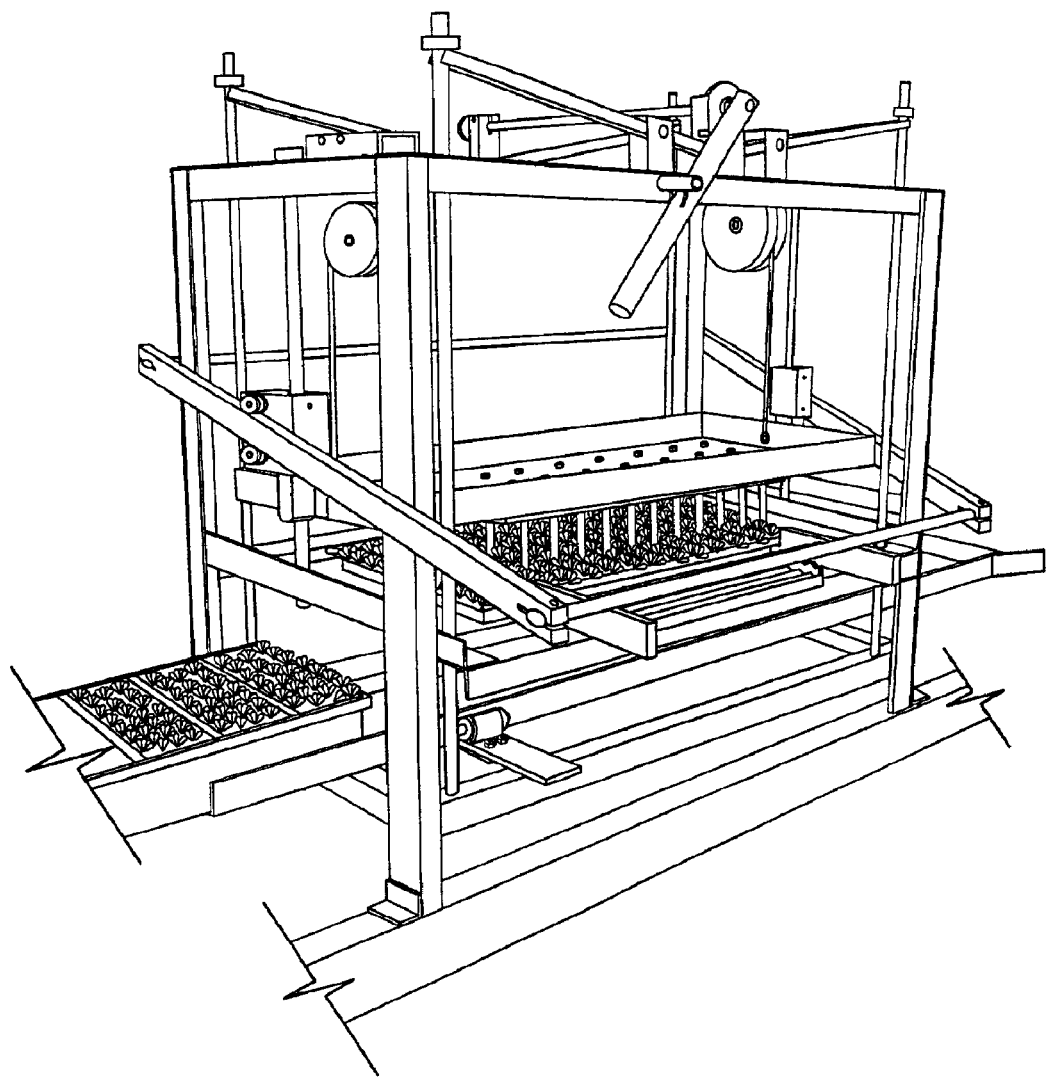
FIG. 21 shows
Figure 22:
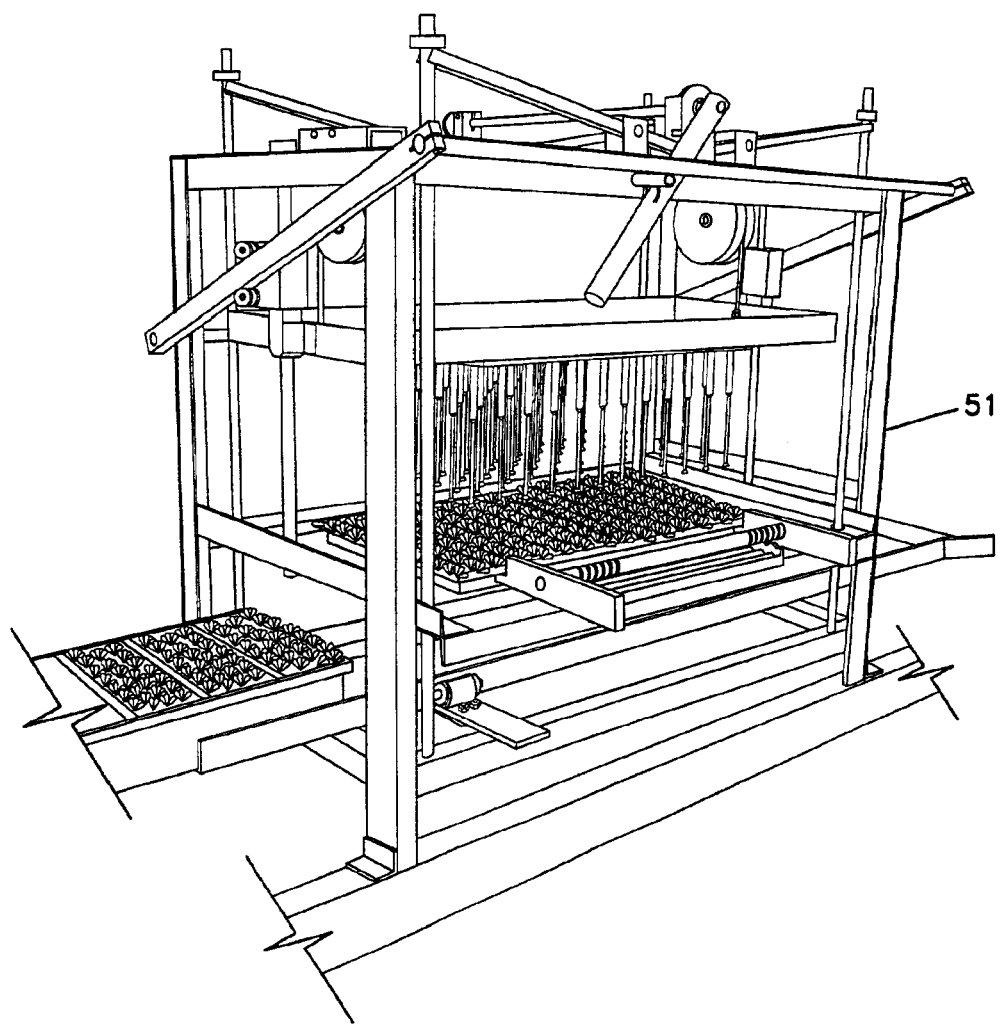
FIG. 22 shows another view of a plant punch machine (a type of plant transplanter) with plant punch elements in a plant punch element assembly and an installed propagule tray.
Figure 23:
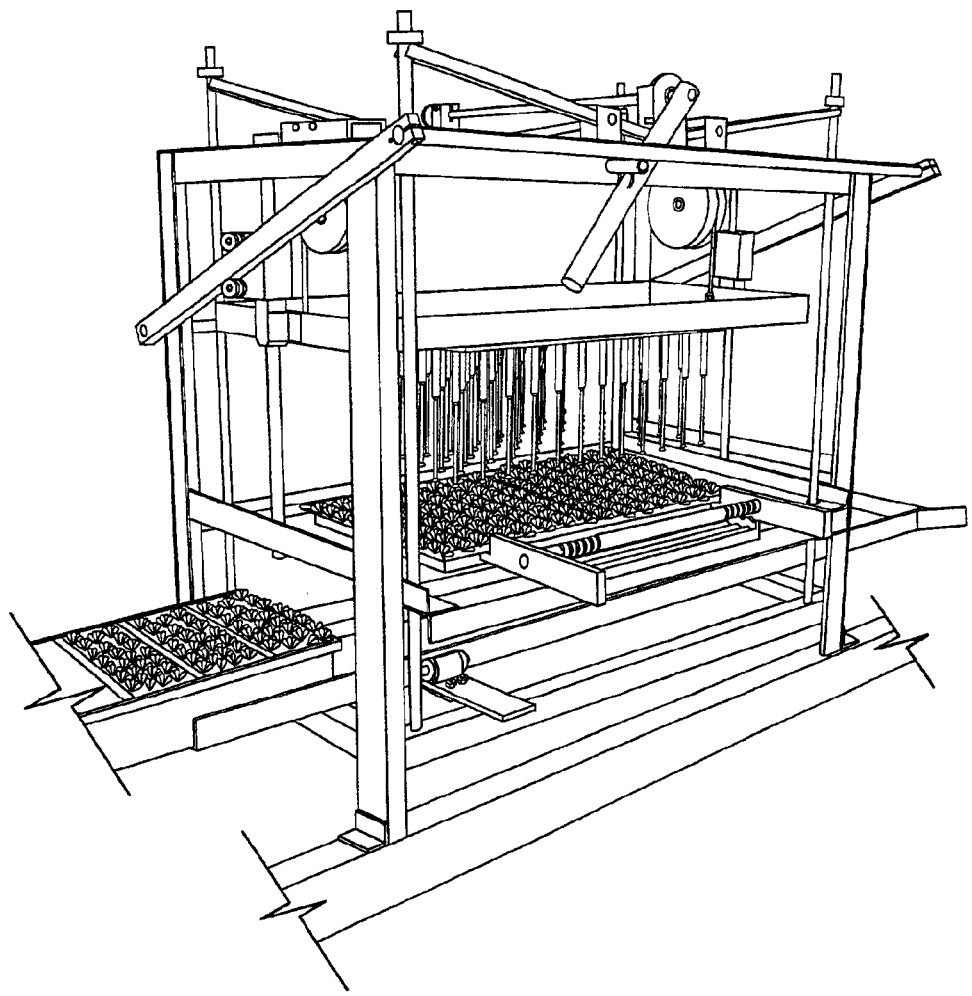
FIG. 23 shows another view of a plant punch machine (a type of plant transplanter) with plant punch elements in a plant punch element assembly and an installed propagule tray.
Figure 24:
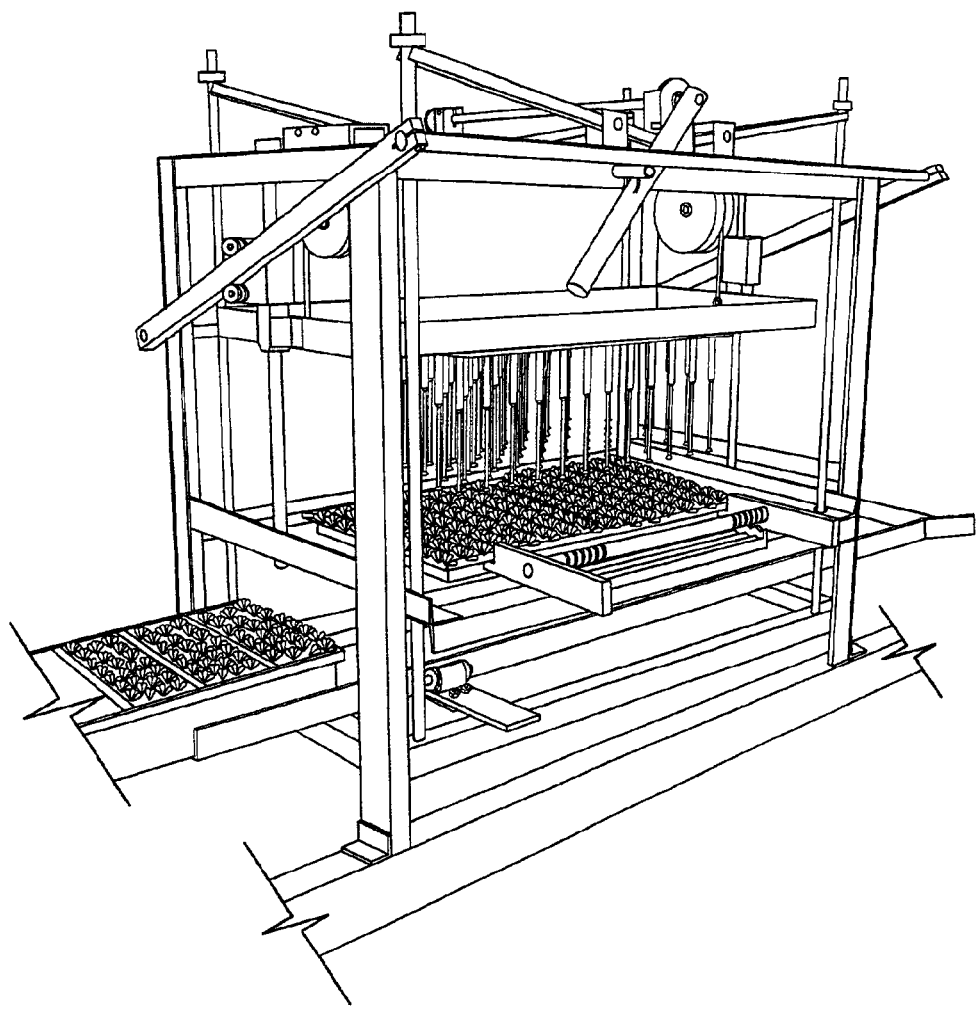
FIG. 24 shows another view of a plant punch machine (a type of plant transplanter) with plant punch elements in a plant punch element assembly and an installed propagule tray.
Figure 25B:
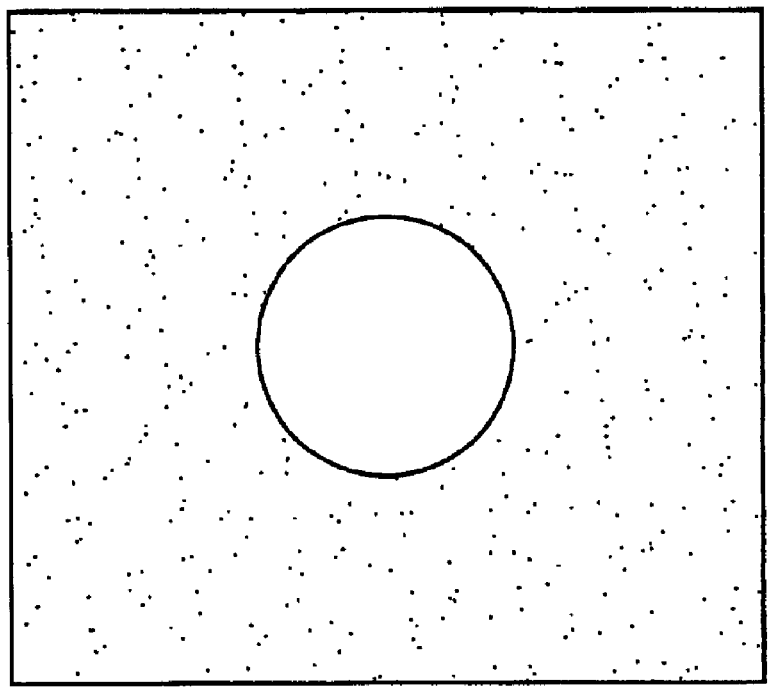
FIG. 25B shows this ratio from the perspective of above the punch head looking down on the cell dimensions.
Figure 25A:
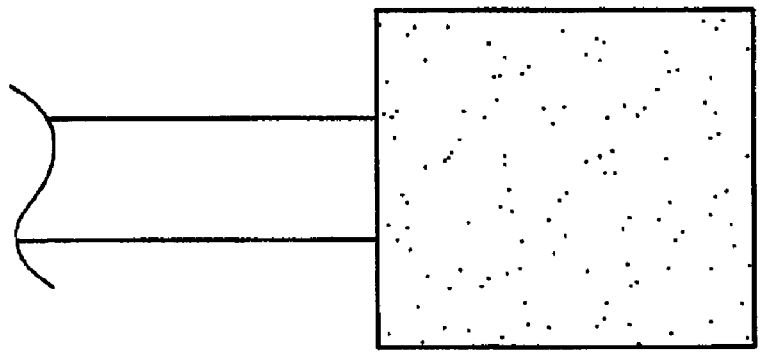
FIG. 25A shows this ratio in profile.

Example 1 shows flat compatibility information for the 243 container propagule tray.

Example 2 shows flat compatibility information for the 324 container propagule tray.

Example 3 shows flat compatibility information for the 432 container propagule tray.

Example 4 shows earlier published flat compatibility information for the 324 container propagule tray.

Example 5 shows earlier published flat compatibility information for the 432 container propagule tray.

Example 6 shows punched plug positions for the 243 container propagule tray with respect to some of the alternative adolescent tray configurations.

Example 7 shows punched plug positions for the 324 container propagule tray with respect to some of the alternative adolescent tray configurations.

Example 8 shows punched plug positions for the 360 container propagule tray with respect to some of the alternative adolescent tray configurations.

Example 9 shows punched plug positions for the 432 container propagule tray with respect to some of the alternative adolescent tray configurations.

Example 10 shows number of pins and pricing information for punch plates used with the 324 container propagule tray.

Example 11 shows number of pins and pricing information for the 432 container propagule tray.

DETAILED DESCRIPTION OF THE PREFERRED EMBODIMENTS

As mentioned, conventional plant punching systems are used only on one (or a very few) type of adolescent plant tray configuration (again, the two row, six column, 12-06 configuration) (1). However, each of the propagule container trays of the present invention is operable (or operationally compatible) with a numerically significant number of alternative adolescent plant tray configurations. Specific embodiments of the propagule transplant tray configurations include a 432 propagule transplant container propagule transplant tray (3) and a 324 propagule transplant container propagule transplant tray (4), each of which may exhibit an arrangement of 12 rows of containers, a 360 propagule transplant container propagule transplant tray (5) and a 243 propagule transplant container propagule transplant tray (6), but trays having other number numbers of propagule transplant containers and/or other numbers of rows and/or columns are considered within the ambit of the inventive technology. It is important to note that the term propagule may also at times be used as a general term that includes the entire propagule plug (7) (which may be defined as the contained soil, together with the contained root and vegetative portion of the plant).

Improvements in efficiency may be realized through increased breadth of application of the propagule plug transplant machine (8) (i.e., several alternative adolescent plant tray configurations (9–2) can receive propagule plugs from one of the invention's areally continuous propagule tray configurations). Nurseries (or greenhouses) can now seed containers of several of any one (or all) of the four propagule plug tray configurations (at present, a 12 row, 432; 12 row, 324; and 18 row 360 container propagule plug tray configuration have been designed, in addition to the 243 container prapagule plug tray configuration, but other configurations are within the ambit of the inventive technology) with the confidence that there is less risk that a reduction in the orders from distributors, e.g., for a certain finished tray configuration will result in costly losses. This confidence may stein, at least in part, from the fact that the 432 tray may be used to fill at least 35 (perhaps this number may increase) alternative adolescent plant tray configurations, the 324 tray may be used to fill at least 38 (perhaps this number may increase) alternative adolescent plant tray configurations, the 360 tray may be used to fill at least 4 (perhaps this number may increase) alternative adolescent plant tray configurations, and the 243 tray may be used to fill at least 8 (perhaps this number may grow) alternative adolescent plant tray configurations. Of course these values are based on the numbers of trays currently requested for use in a plant punch machine at the time of filing of the non-provisional application and may change, as may the numbers of trays and the associated percentages in the definition of each of the terms operationally compatible and numerically significant. Current flat (or tray) compatibility tables are as shown in Examples 1–5 while punched plug positions are shown in Examples 6–9.

At least three of the possible propagule transplant tray configurations of the present technology—the 12 row, 432 and 324 container configurations, and the 360 propagule container configuration—each have their indicated number of rows and/or containers as a result of the fact that the numbers six and twelve (and multiples thereof), often appear in several facets of the nursery business. This itself appears to be a manifestation simply of the desire of consumers to buy in quantities of six or twelve adolescent plants (although, of course, some trays may contain plants that are not integer multiples of the number six, where the term integer multiple means, e.g., 1 times a certain number, two times that certain number, three times that certain number, etc.). As a result of the half dozen or dozen "theme", each of the numbers 432, 324 and 360 are somewhat unique in their relationship with the number six: 432 is evenly divisible (i.e., has a remainder of zero) by all but two of the first eight integer multiples of six (i.e., 6, 12, 18, 24, 30, 36, 42, 48), 324 is evenly divisible by all but two of the first six integer multiples of six, and 360 is evenly divisible by all of the first six integer multiples of six. Although these numbers are not the only numbers that share the specified mathematical relationship (e.g., there are other numbers that are evenly divisible by all but two of the first eight integer multiples of six), it appears that a tray configuration exhibiting propagule transplant containers in any of these numbers is novel.

Note that the 243 propagule tray (or plug tray) may be intended for use alongside another 243 tray as installed in a plant punch machine. This double, adjacently abutting set-up is intended to facilitate punching into square trays. Note that the individual propagule containers of the 243 tray may have a rectangular horizontal cross-section shape in a preferred embodiment (but square containers (or containers of any other shape such as, e.g., circular) are within the ambit of the inventive technology). Similarly, individual containers of any of the propagule (or seedling) trays may have a horizontal cross-section of any shape(s). The 243 tray may be 9 row×27 column in arrangement (but other arrangements are considered within the ambit of the inventive technology, as are arrangements of other propagule trays (e.g., the 324, the 360 and the 432 tray) that are different from those disclosed).

Other important aspects of the inventive technology include: use of a plug tray that has one species planted in one portion (e.g., a half) and another in the remaining portion, punching this tray once in a punch machine and then reconfiguring it (with respect to the punch machine and the finished tray) 180 degrees so that a mixed planting results in the finished tray; doubling the tray along the length of the machine as installed in order to increase punching speed and process efficiency; doubling trays along the width in order to fill a larger adolescent tray without having to reconfigure plug trays or reinsert additional trays; automatically moving a filled adolescent tray out of the punch machine and replacing it with an empty adolescent tray; and using unpunchable plugs to fill vacancies in the adolescent plant tray.

A plant transplant apparatus may comprise: a matrix of propagule transplant containers (21), wherein each of a plurality of the propagule transplant containers is adapted to contain propagule growth medium (13) and at least one propagule (14), is established by at least one propagule growth medium retention element (15, 16) and has a substantially horizontal upper container opening area (17) which is larger than a plant punch element head (18) area (19); a yieldable exit element (20) established integral to the at least one propagule growth medium retention element; an areally continuous, substantially planar, arrayed, propagule growth support lattice element (22) interconnecting the matrix of propagule transplant containers; an integral edge definition element (23) which defines a large number of the propagule transplant containers that is operationally compatible with a numerically significant number of alternative adolescent plant tray configurations; and a tray movement guide (24) responsive to the integral edge definition element. The matrix of propagule transplant containers may be an unconnected arrangement (in perhaps a rectilinear fashion (e.g., row/column) or not) of propagule transplant containers that are adapted to (or are able to) contain propagule growth medium (such as soil) and at least one propagule (such as a seedling, or a small juvenile plant (e.g., younger than a more mature adolescent plant)), and are established by a propagule growth medium retention element (e.g., a wall of some sort that is capable of retaining in a position that is beneficial to a propagule a certain quantity of growth media(um). The container (25) may have a substantially horizontal upper container opening area that is larger than a plant punch head area (or plant punch element head area). The yieldable exit element established integral to the at least one propagule growth medium retention element refers to, e.g., at least one part of the bottom of the retention element that perhaps is made flexible (and thus yieldable upon the application of a downward force as imparted by, e.g. a plant punch element) by at least one cut or slit (20) in the bottom of the retention element (if the retention element were conical (or frustum) in shape, then the slits may be substantially vertically along the length of the conical wall).

The yieldable exit element may also allow for drainage of water from the container. The term established integral to the at least one propagule growth medium retention element indicates that, e.g., the yieldable exit element is part of the propagule growth retention element. The term areally continuous indicates that the propagule growth support lattice element interconnects the matrix of propagule transplant containers in an unclustered fashion (as shown by 3, 4), so that an arrangement of a relatively few (such as four) containers is repeated uniformly throughout the matrix. Note that the term areally continuous does not preclude a row median (or dividing barrier) that is wider than a column median (or vice versa) (see 26); instead the term is used to indicate that the clustered arrangement of propagule transplant containers found in the conventional propagule tray (1) is absent. Substantially planar indicates that the lattice element, which is the structural web (22) that interconnects the matrix of propagule transplant containers, has a generally flat shape. A lattice element, and the interconnected matrix that it forms, may be said to have a substantially planar shape even though a brief examination will, of course, reveal a textured surface (of course, there are many "ridges" and "valleys" on either side of the tray caused by the containers). Nonetheless, and despite the presence of these features, the lattice element and the interconnected matrix that it forms are said to have a substantially planar (or uniplanar) shape. The integral edge definition element which defines a large number of the propagule transplant containers that is operationally compatible with a numerically significant number of alternative adolescent plant tray configurations refers to, e.g., the outer edge of the interconnected matrix of propagule containers, and may simply be e.g., the outer retaining walls of containers located on the outer edge of the interconnected matrix. The term "defines" means, e.g., encloses or demarcates through borders. The tray movement guide may be a structural part in separate form, but connected to the integral edge definition element, or it may, in fact, be the integral edge definition element (or at least part of it).

The term large number indicates a number that is larger than 120, larger than 220, or larger than 300, depending on the market demand, the availability of trays, the individual plant costs, the distribution specifics, the urgency of the demand, and generally the economics of the finished tray production (as but a few examples), as a person of ordinary skill in the art would immediately recognize. A propagule plug tray configuration is operationally compatible with an certain adolescent plant tray configuration when the resultant plug placement positions relative to adolescent plant container walls (or more generally, growth medium retention elements) is acceptable (it is acceptable when, e.g., it is not "not recommended") and when the number of propagule containers (the large number) in the propagule plug tray configuration divided by the number of adolescent containers in the adolescent plant tray configuration comports with certain value constraints as dependent on the number of propagule containers in the propagule tray. More specifically, operationally compatible for the 432 container propagule transplant tray may indicate that said large number of said propagule transplant containers divided by said number of adolescent plant containers is an integer number having as a remainder a number that is a member of at least one number set selected from the group of number sets consisting of: zero, less than 13, less than 17, less than 33, and less than 19 (note that the term integer number refers to a whole integer number such as 1, 2, 3, 4, 5, 6, 7, etc). Operationally compatible for the 324 container propagule transplant tray may indicate that said large number of said propagule transplant containers divided by said number of adolescent transplant containers is an integer number having as a remainder a number that is a member of at least one number set selected from the group of number sets consisting of: zero, less than 5, less than 10, less than 25, and less than 37. Operationally compatible for the 360 container propagule transplant tray may indicate that said large number of said propagule transplant containers divided by said number of adolescent transplant containers is an integer number having as a remainder a number that is a member of at least one number set selected from the group of number sets consisting of: zero, and less than 25. Operationally compatible for the 243 container propagule transplant tray may indicate that twice said large number of said propagule transplant containers divided by said number of adolescent transplant containers is an integer number having as a remainder a number that is a member of at least one number set selected from the group of number sets consisting of: zero, less than 7, less than 12, less than 19, less than 39, and less than 45. The selection of the type of propagule transplant tray and the value of the remainder after a certain tray is selected may depend on the market demand, the configuration of the finished or adolescent tray to be filled, the availability of plant punch element assemblies, the availability of trays, the acceptability of "left-over" unpunchable propagules, the individual plant costs, the distribution specifics, the urgency of the demand, and generally the economics of the finished tray production (as but a few examples), as a person of ordinary skill in the art would immediately recognize. Note that definition of the term operational compatibility is not necessarily the same as that of the term compatibility as used in at least one embodiment of the retrievable collection of plant process information. Note that a non-zero remainder does not necessarily mean that no rows remain as unpunchable in a certain application and that the remainder does not necessarily equal the number of unpunchable plugs (e.g., plugs that remain after the maximum number of propagule plugs has been punched from a propagule transplant tray in a given application (e.g., when 324 plug tray is used to punch into the 12-03T finished tray, the remainder is zero, but three rows still remain in the plug tray); such an unexpected result may arise because of unacceptable plug placement into the finished tray). Note that as the number of finished trays that customers request may increase, the values above may be supplemented by additional data.

The term numerically significant number of alternative adolescent plant tray configurations is also defined according to which propagule transplant tray is being used for a certain application. For the 432 container propagule transplant tray, the numerically significant number of alternative adolescent plant tray configurations may be a numerically significant number of alternative, non-square adolescent plant tray configurations and may be a number that is a member of at least one number set selected from the group of number sets consisting of: greater than 27, greater than 29, greater than 33, greater than 34, greater than 11, greater than 13, greater than that number corresponding to about 39 percent of alternative, non-square adolescent plant tray configurations (32), greater than that number corresponding to about 46 percent of alternative, non-square adolescent plant tray configurations, greater than that number corresponding to about 54 percent of alternative, non-square adolescent plant tray configurations, greater than that number corresponding to about 58 percent of alternative, non-square adolescent plant tray configurations, greater than that number corresponding to about 66 percent of alternative, non-square adolescent plant tray configurations, and greater than that number corresponding to about 68 percent of alternative, non-square adolescent plant tray configurations. For the 324 container propagule transplant tray, the numerically significant number of alternative adolescent plant tray configurations may be a numerically significant number of alternative non-square adolescent plant tray configurations and may be a member of at least one number set selected from the group of number sets consisting of: greater than 9, greater than 14, greater than 15, greater than 17, greater than 23, greater than 24, greater than 26, greater than 38, greater than that number corresponding to about 16 percent of alternative, non-square adolescent plant tray configurations, greater than that number corresponding to about 26 percent of alternative, non-square adolescent plant tray configurations, greater than that number corresponding to about 28 percent of alternative, non-square adolescent plant tray configurations, greater than that number corresponding to about 32 percent of alternative, non-square adolescent plant tray configurations, greater than that number corresponding to about 44 percent of alternative, non-square adolescent plant tray configurations, greater than that number corresponding to about 46 percent of alternative, non-square adolescent plant tray configurations, greater than that number corresponding to about 48 percent of alternative, non-square adolescent plant tray configurations, greater than that number corresponding to about 52 percent of alternative, non-square adolescent plant tray configurations, and greater than that number corresponding to about 72 percent of alternative, non-square adolescent plant tray configurations. For the 360 container propagule transplant tray, the numerically significant number of alternative adolescent plant tray configurations may be a numerically significant number of alternative, non-square adolescent plant tray configurations and may be a member of at least one number set selected from the group of number sets consisting of: greater than 2, greater than 3, greater than that number corresponding to about 4 percent of alternative, non-square adolescent plant tray configurations, greater than that number corresponding to about 6 percent of alternative, non-square adolescent plant tray configurations. For the 243 container propagule transplant tray, the numerically significant number of alternative adolescent plant tray configurations may be a numerically significant number of alternative, square adolescent plant tray configurations (33) and may be a member of at least one number set selected from the group of number sets consisting of: greater than or equal to one, greater than or equal to three, greater than or equal to four, greater than or equal to five, greater than or equal to six, greater than or equal to seven, greater than or equal to that number corresponding to about 14 percent of alternative, square adolescent plant tray configurations, greater than or equal to that number corresponding to about 42 percent of alternative, square adolescent plant tray configurations, greater than or equal to that number corresponding to about 57 percent of alternative, square adolescent plant tray configurations, greater than or equal to that number corresponding to about 71 percent of alternative, square adolescent plant tray configurations, greater than or equal to that number corresponding to about 85 percent of alternative, square adolescent tray configurations, and equal to that number corresponding to about 100 percent of alternative, square adolescent plant tray configurations. The actual value of the numerically significant number may depend on the marker demand, the availability of trays, the acceptability of "left-over" unpunchable propagules, the individual plant costs, the distribution specifics, the urgency of the demand, and generally the economics of the finished tray production (as but a few examples), as a person of ordinary skill in the art would immediately recognize. Note that as the number of finished trays available that customers request may increase, the values above may change.

Note that an alternative adolescent plant tray configuration refers to an adolescent plant tray configuration that has a different row number and/or column number (of individual adolescent plant containers (27) or adolescent plant container groupings (28)) than at least one other adolescent plant tray configuration, and/or that has a different number of adolescent plant containers per grouping for a given finished or adolescent plant tray than at least one other adolescent plant tray configuration, and/or that has the same row/column arrangement but is differently sized. (Importantly, note that a grouping is not analogous to a cluster of the conventional propagule container trays). As such, a 12-04 adolescent plant tray (12 container groups per finished tray, 4 containers per group) is an alternative configuration when compared with a 12-06 adolescent plant tray, and a 12-04T is an alternative configuration when compared with a 12-04R or a 12-04S adolescent plant tray configuration (the T, R and S merely indicate different sizes of the trays). Note that some adolescent plant tray configurations may have two or more propagules per individual container. At the time of the filing of the non-provisional application, there were approximately 50 alternative non-square adolescent plant tray configurations and approximately 7 alternative square adolescent plant tray configurations which had been requested by customers and for which compatibility information had been determined (for a total of 57 alternative adolescent plant tray configurations). Note that the term square adolescent plant tray configuration does not necessarily mean that a total number of the containers is a square of an integer number, nor that the total number of container groupings (i.e., 6 in the 6-08 tray) is a square of an integer number. For example, the 6-8 Sq tray does not have a number of groupings (6) that is a square number, nor does it have a number of containers (6×8=48) that is a square number. However, a square tray does have a length that is approximately equal to its width. Also note that the number of adolescent plant containers of at least one of the alternative adolescent plant tray configurations is a number selected from the group of numbers consisting of: 15, 18, 20, 32, 36, 48, 54, 60 and 72.

The tray movement guide responsive to the integral edge definition element refers to that portion of the propagule plug tray that may be used to guide or secure the tray in position for punching and may simply be the outer edge of the interconnected matrix of propagule containers. The areally continuous, substantially planar, arrayed, propagule growth support lattice element may be a patterned, web-type structure used to interconnect the matrix of propagule transplant containers and may comprise a plurality of propagule transplant container row (or column) medians (26) (or dividing barriers) that are each the same width as or instead that are each wider (or thinner) than each of a plurality of propagule transplant container column medians (29); as used herein, row refers to aligned containers that run left and right of a plant punch machine user upon installation of the trays while column refers to aligned containers that run towards and away from a plant punch machine user upon installation of the trays. The at least one propagule growth medium retention element may be four substantially vertical propagule growth medium retention walls and one bottom, substantially horizontal propagule growth medium retention floor or the at least one propagule growth medium retention element may be a frustum propagule growth medium retention wall (wherein frustum refers to a base portion of a cone), as but a few examples.

A corollary method of plant transplantation may comprise the steps of: establishing a matrix (e.g., a row/column arrangement) of propagule transplant containers; adapting each of a plurality of the propagule transplant containers to contain one propagule growth medium and at least one propagule; establishing each of a plurality of the propagule transplant containers by at least one propagule growth medium retention element; creating each of a plurality of the propagule transplant containers with an upper container opening area (an upper portion of a container that is able to, inter alia, accept material for subsequent retention within the container) that is larger than a plant punch head area; establishing a yieldable exit element as part of the at least one propagule growth medium retention element; interconnecting the matrix of propagule transplant containers by an areally continuous, substantially planar, arrayed, propagule growth support lattice element; defining with an integral edge definition element a large number of the propagule transplant containers that is operationally compatible with a numerically significant number of alternative adolescent plant tray configurations; and establishing a tray movement guide that is responsive to the integral edge definition element. The step of adapting each of a plurality of the propagule transplant containers to contain one propagule growth medium and at least one propagule is accomplished if each of a plurality of the propagule transplant containers is able to contain one propagule growth medium and at least one propagule. As used in the step dimensioning each of the plurality of the propagule transplant containers to be volumetrically smaller than each of the plurality of adolescent plant containers of each of the alternative adolescent plant tray configurations, dimensioning may refer generally to designing, or sizing or forming according to certain dimensions. The term spatially reconfiguring the interconnected matrix of propagule transplant containers relative to an arrangement of plant punch element heads refers to, e.g., repositioning after a punch event via, e.g., an indexing system (30), either the interconnected matrix of propagule transplant containers (3, 4, 5) or plant punch element assembly in order to enable a new punch event and transplantation of another set of propagules. Certain steps in the plant transplantation method may be performed in a repetitive fashion a certain number of times, where that number may be, e.g., substantially equal to an integer "round below" of that number that is equal to the large number of the propagule transplant containers defined by the integral edge definition element of the at least one installed adolescent plant tray divided by the number of adolescent plant containers of the output tray; the term "round below" is simply the largest integer number that is less than or equal to the result of the division of the indicated operands (e.g., if the result of the division is 11.73, then the integer "round below" would be 11).

Figure 26C:
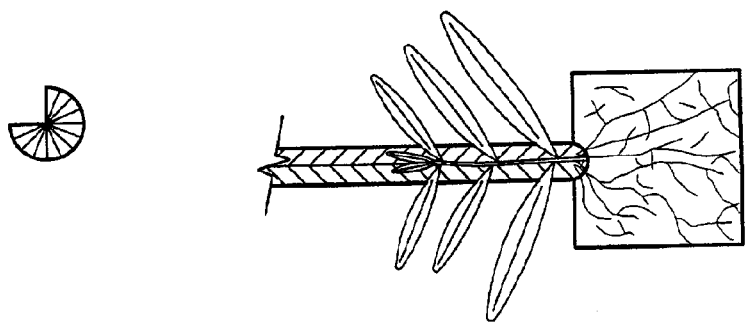
FIGS. 26B and 26C show the punch head descending on the seedling cell and the seedling located in the nook of the kidney shaped punch head. The seedling may not be in contact with the punch head as the punch head descends onto the seedling cell.
Figure 26B:
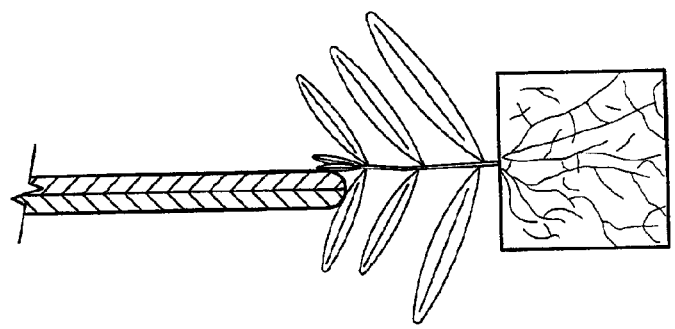
Figure 26A:
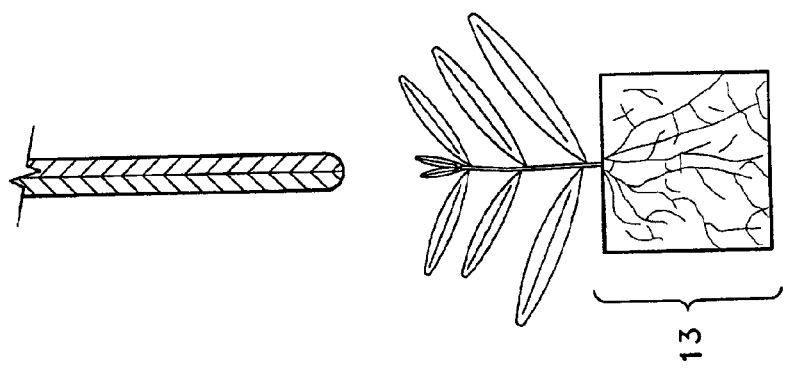
FIG. 26A shows an overhead of the punch head on the seedling cell with the seedling located in a particular quadrant of the seedling cell.
Figure 27B:
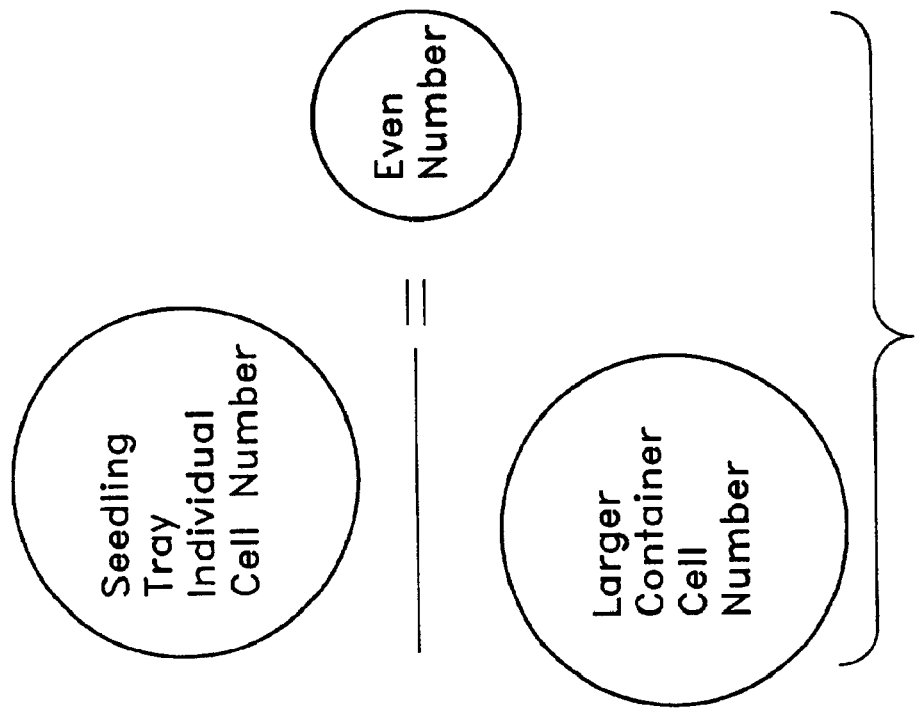
FIG. 27 conceptually shows the transplanter transplanting seedlings from the two seedling trays into multiple larger container trays. The number of seedling trays transplanted at one time may be determined by the multiple of the larger container trays. This may even show an improvement in efficiency of tow or three times.
Figure 27A:
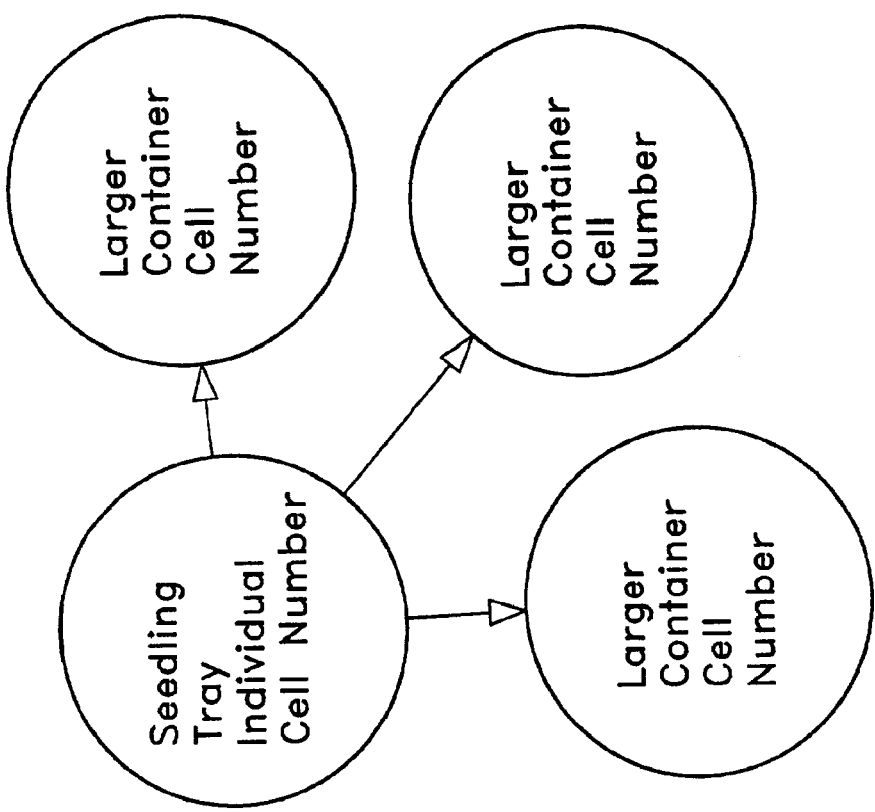
Figure 28:
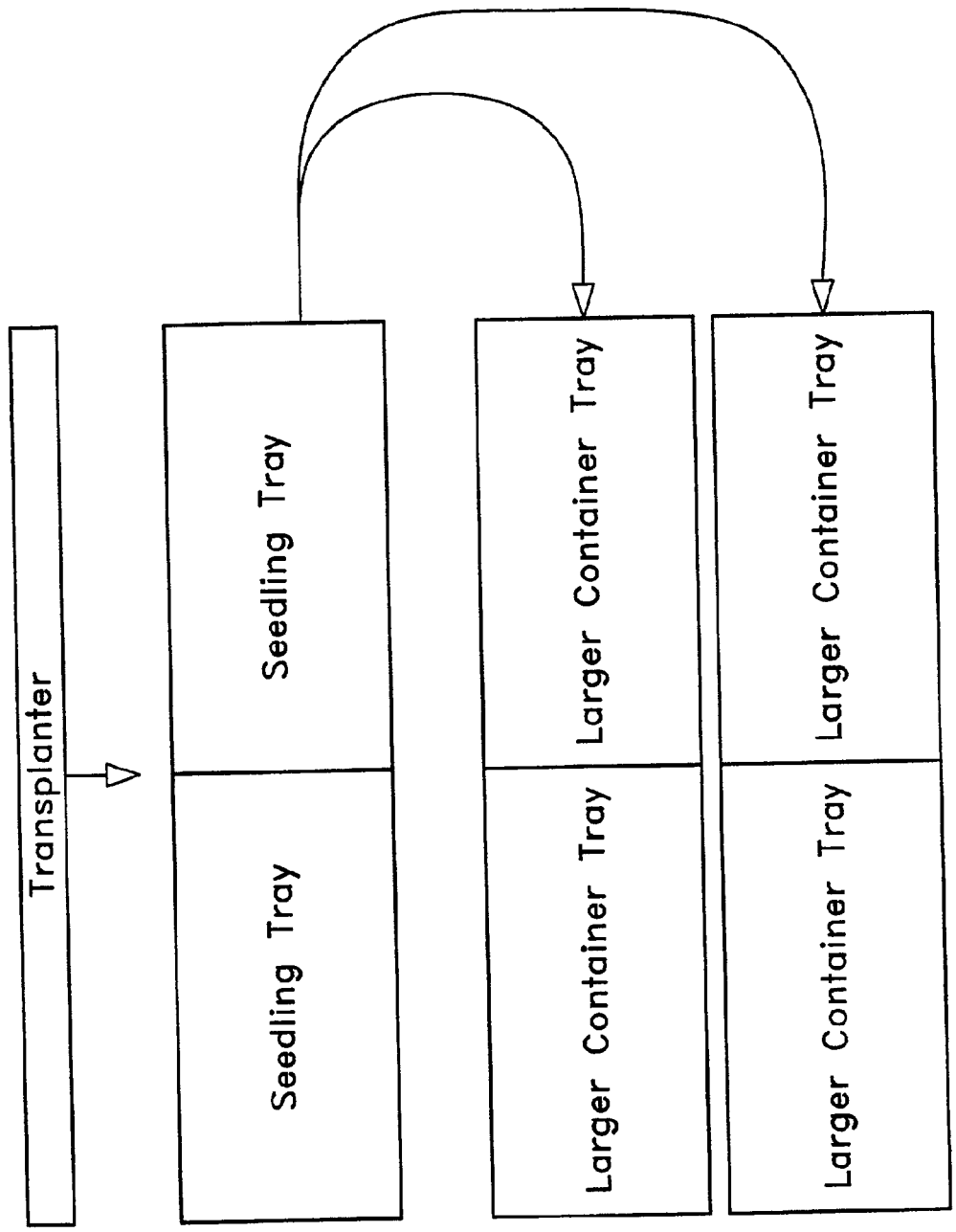
FIG. 28 shows conceptual relationships similar to those in FIGS. 27A–B.
Figure 29A:
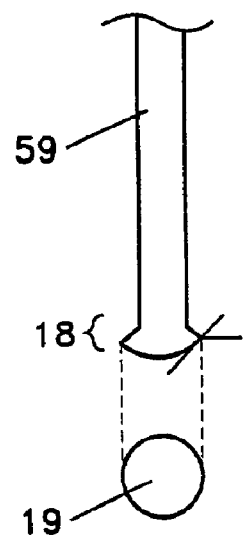
FIG. 29 shows convex and non-convex (flat) headed plant punch elements, with corresponding projected punch head areas.
Figure 29C:
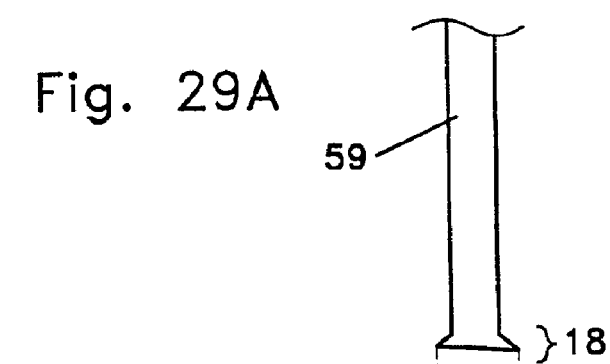
Figure 29B:
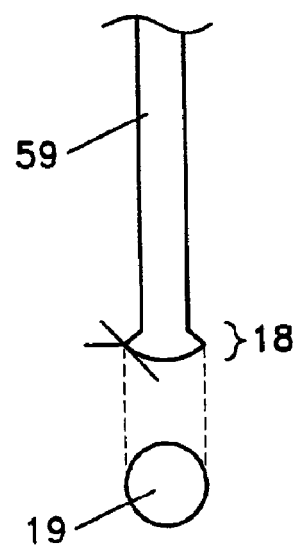
Figure 30:
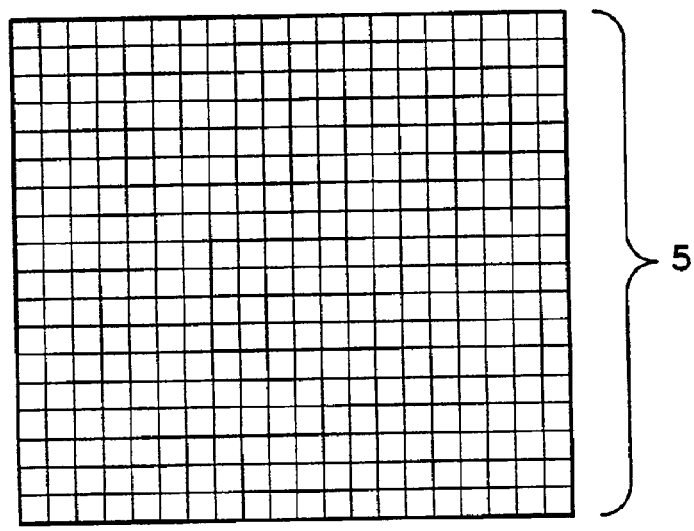
FIG. 30 shows a 360 container propagule tray and a 243 container propagule tray.
Figure 30:
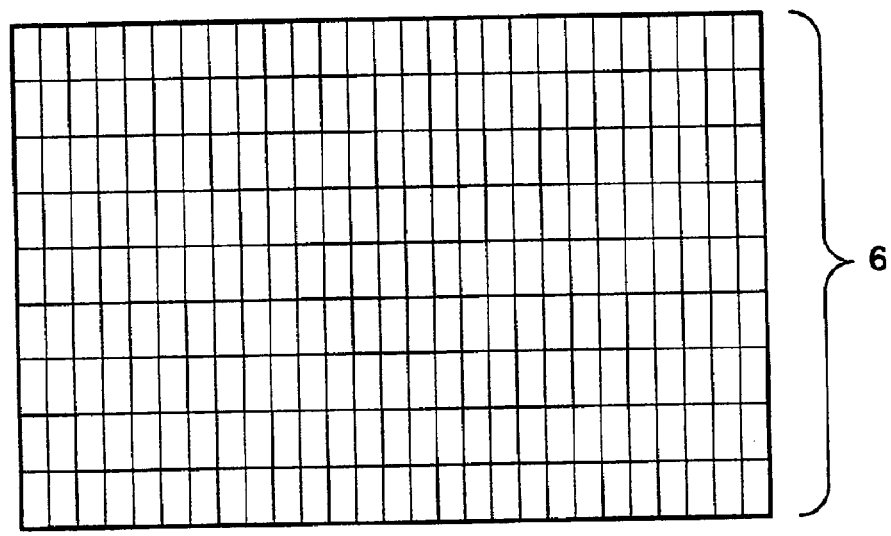
Figure 31A:
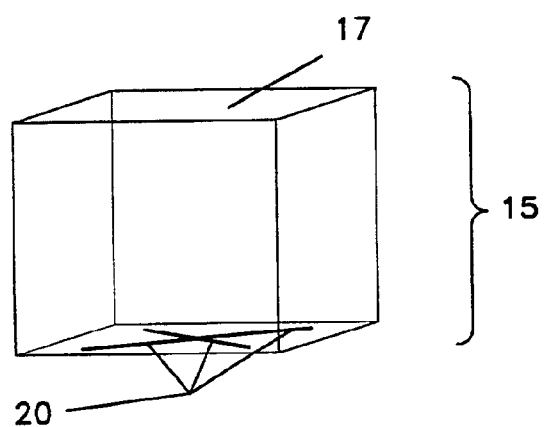
FIG. 31 shows a box-like propagule growth medium retention element (with yieldable exit element), a propagule, and a frustrum propagule growth medium retention element (with yieldable exit element).
Figure 31B:
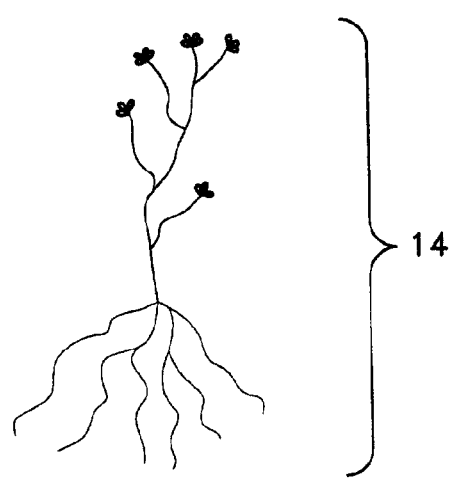
Figure 31C:
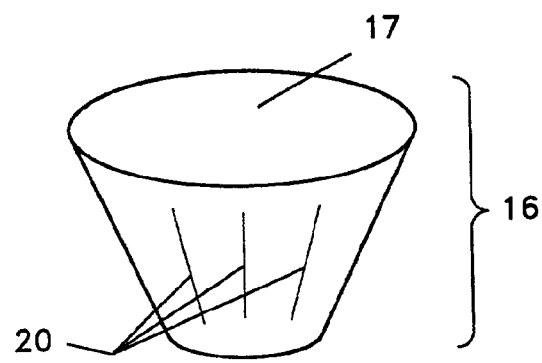
Figure 32:
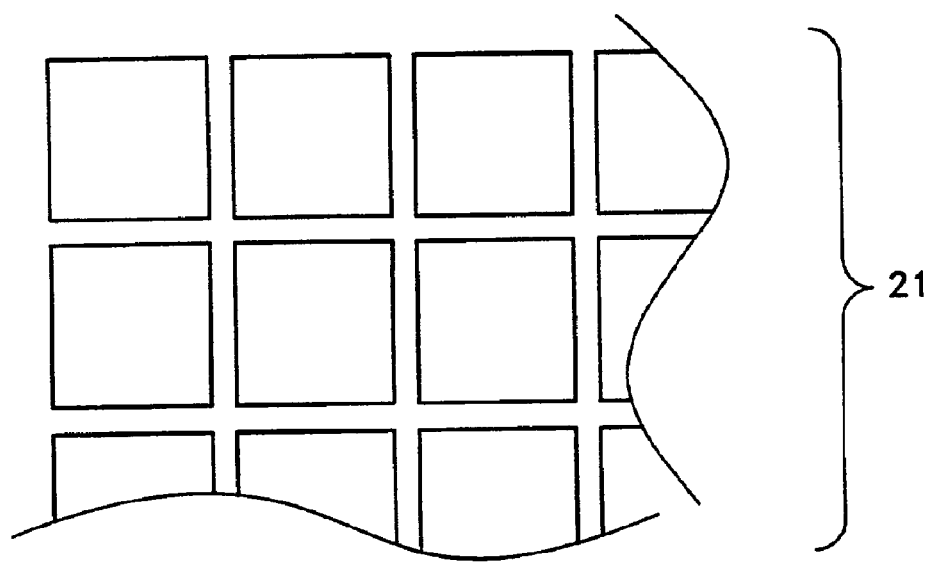
FIG. 32 shows an areally continuous, substantially planar, arrayed, propagule growth support lattice element.
Figure 32:
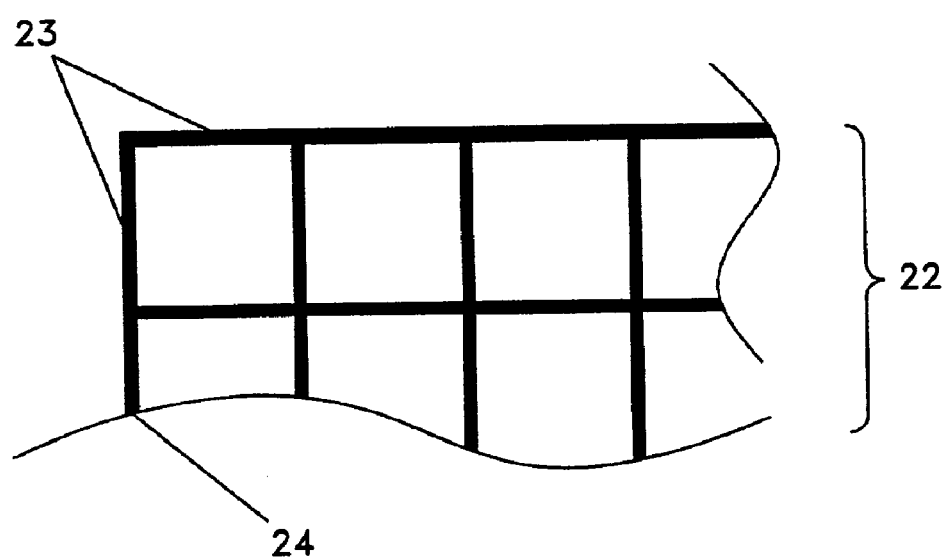
Figure 33:
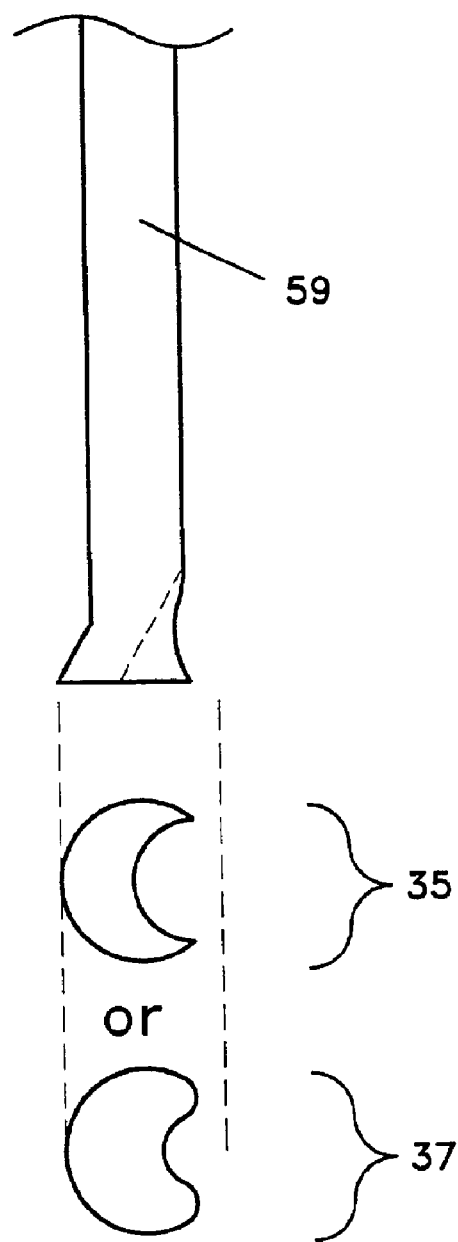
FIG. 33 shows a plant punch element having a non-circular punch head surface.
Figure 34A:
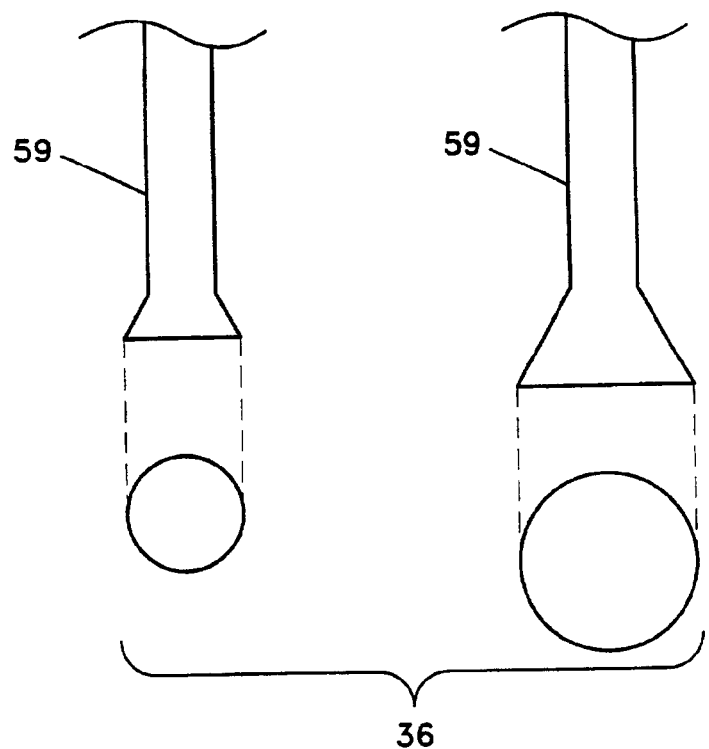
FIG. 34 shows punch elements having differently sized punch head surfaces, a punch element that is curved so as to provide one means of off-center (e.g., not in the center of the adolescent plant container) punching, and punch elements of different length.
Figure 34B:
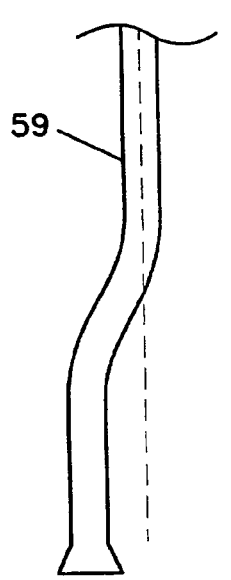
Figure 34C:
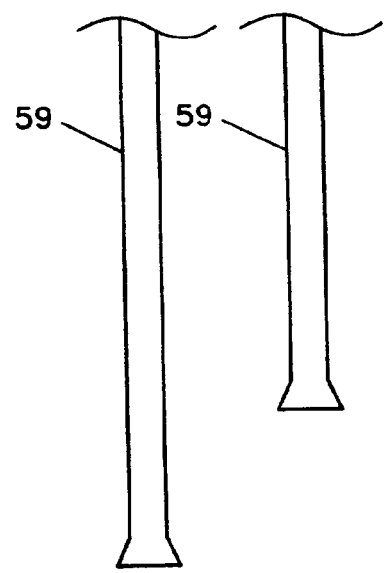
Figure 35:
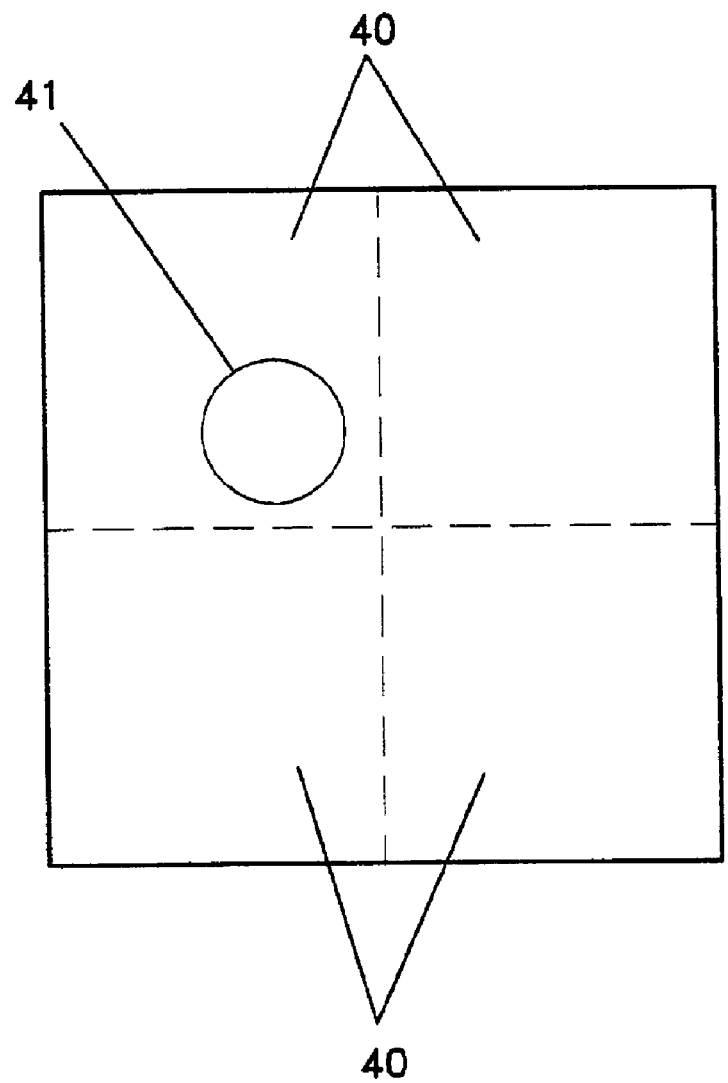
FIG. 35 shows an aerial view of an off-center punch, and of quadrants of a square adolescent plant container.
Figure 36:
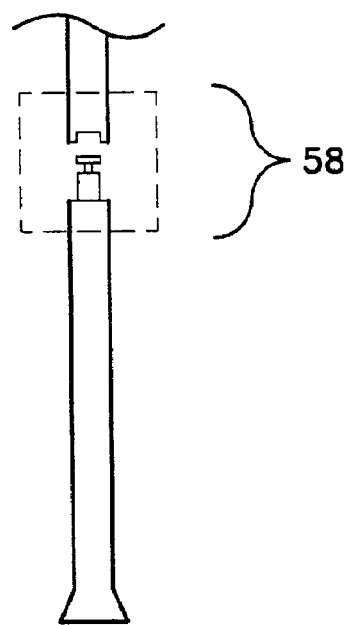
FIG. 36 shows a user-detachable plant punch element. information for the 243 container propagule tray.
Figure 36:
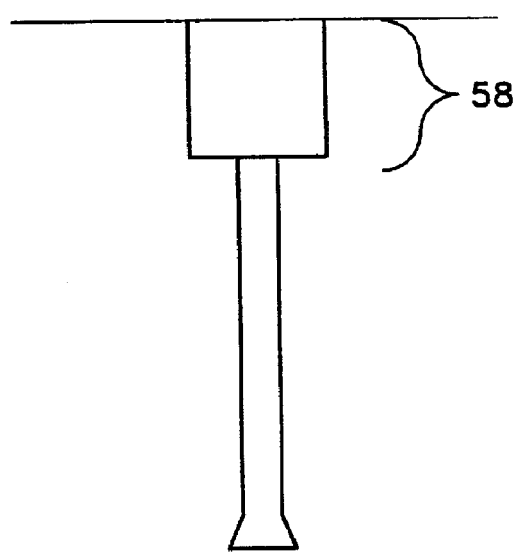

Another aspect of the invention is a plant transplanter (31) whose punch elements are user-detachable, enabling use of punch elements that have a specific design or that enable use for a certain transplant modality, thereby facilitating an increase in transplant yield. Yet another aspect of the invention is a plant transplanter (e.g., a plant punch machine) that may be usable with plant punch assemblies (34) that may have different punch pin (or plant punch element) designs. A single plant punch assembly may have punch elements of different designs (and/or enabling a certain operation) or a single plant punch element (29a, 29b, 29c) assembly may have punch elements of a similar design. A certain punch element design may be chosen in order to optimize yield and/or survivability of transplanted plants of a given species and for a given modality. The punch elements may comprise a variable selection system, which may be as simple as a collection of punch elements having different designs, or may be as complex as a computer controlled selection implementation system. This system may comprise a system that is variable with a parameter chosen from at least one of a group consisting of size selection parameter (relates to, e.g., size of the punch element head (36)); location selection parameter (relates to, e.g., the location at which the punch element contacts the propagule plug or the propagule (see FIG. 26)); convexity selection parameter (relates to whether or not a punch head surface is convex, and if so, the extent of the convexity (see FIG. 29, e.g.); shape selection parameter (relates generally, e.g., the shape and/or size of the plant punch element or of the head of plant punch element (FIGS. 29, 33, 34a, 34b, e.g.); length selection parameter (relates to the length of the plant punch element); plant divergence selection parameter (relates to, e.g., whether the punch element is designed or is used to push aside the plant during a punch event, and if so, the design and/or the extent and/or direction of such divergence (FIGS. 29, 34b, e.g.)); media intrusion selection parameter (relates to, e.g., the extent to which media, such as soil, may be compacted during a punch event (see 36)); circularity selection parameter (relates to, e.g., whether a plant punch element having a non-circular punch head surface (35, 37, e.g.) should be used, and if so, to what extent the head surface should be non-circular); and quadrant variance selection parameter (relates to, e.g., the quadrant (40) respective location at which the punch element contacts (41) the propagule plug or the propagule). Note that the term convexity is defined to also include what might be considered inverse convexity (essentially concavity).

A plant transplanter contemplated by the invention may comprise a frame element (51, e.g.) (such as a supporting framework structure, e.g.), an interconnected propagule transplant container matrix guide (52, e.g.) (such as, e.g., a metal or plastic part) that is coordinated with an interconnected matrix of propagule transplant containers (53) (coordinated, meaning, e.g., perhaps situated on either side of the installed interconnected propagule transplant container matrix and functionally able to properly align via, e.g., slidable engagement, an interconnected propagule transplant container matrix so that the propagule transplant container matrix may be punched with accuracy and efficiency), an interconnected adolescent plant container matrix guide (55) (for example, a metal or plastic part) situated parallel to at least a portion of the interconnected propagule transplant container matrix guide; an orthogonal plant punch support (56) (e.g., a vertically aligned structure that serves to guide the punch element through a propagule tray); a movement mechanism (57) (which may, e.g., be a handle and associated structure used by a user of a punch machine to effect a vertical movement of plant punch elements to punch propagules and/or propagule plugs) to which the orthogonal plant punch support is responsive; a user detachable interconnect element (58, e.g.) (which may be, e.g., a manual snap-on/off device that allows detachment and attachment of a plant punch element (e.g., a propagule (or plant) punch pin); at least one plant punch element (59) removably attached to the user detachable interconnect element, responsive to the movement mechanism and capable of movement within the interconnected matrix of propagule transplant containers (or propagule trays) when installed; and an automated position system (30) to which the interconnected matrix of propagule transplant containers are responsive when installed. The term position system refers to a system by which the matrix of propagule transplant containers may be moved relative to the plant punch elements. Automated indicates that the position system involves some type of guiding to facilitate accurate repositioning between punches. Automating may be as simple as a manually operative indexing system (30) or as complex as a computer controlled system. The user detachable interconnect element may be a quick disconnect element such as, e.g., a biased snap-on device that allows detachment upon vertical movement of a plant punch element with respect to a horizontal plant punch element support base.

Methods corollary to the apparatus are also contemplated as part of the invention. A method of cultivating plants may comprise the step of determining to transfer a given plant species using a given transplant modality; obtaining an interconnected matrix of propagule transplant containers; selecting at least one transplant modality appropriate plant punch element which is coordinated with said given transplant modality; user interconnecting the at least one transplant modality appropriate plant punch element; extruding a plurality of propagules from a plurality of propagule transplant containers through action of said at least one transplant modality appropriate plant punch element. The term modality is intended to refer also to a certain setting or adjustment of variable parameters (such as plant punch convexity, off-center punching, circularity (including whether to vary at all and to what extent), as but a few examples) that result in improved transplanting yield for, e.g., transplanting for eventual distribution and growth in a certain geographic location. For instance, if it is determined that petunia propagules are to be transplanted into adolescent trays for eventual growth (and perhaps also distribution and sale) in northwestern Oregon, it may be desirable (in order to improve yields over those yields found using conventional apparatus and methods) to use a certain punch element head size, a certain punch element head shape, a certain punch element head length, a certain punch element head circularity (or non-circularity, as would be found with a punch element head having a "C" or kidney-shaped surface(37)), and/or a certain plant divergence, as might be afforded by a convex headed punch element head surface. The step of selecting at least one transplant modality appropriate plant punch element which is coordinated with the given transplant modality refers to selecting at least one punch element that has an adjustment or variation in at least one parameter that results in plants which, after punching, may exhibit a higher survivability and/or yield as compared with results observed upon using conventional punch element heads. The modality, again, may be selected as based upon, e.g., the location in which the adolescent plants are eventually to be distributed and/or planted; a transplant modality appropriate plant punch element coordinated with a given transplant modality is a plant punch element that exhibits the specific dimensions (for example) that are indicated for that modality. The step of user interconnecting the at least one transplant modality appropriate plant punch element refers to, e.g., physically (not necessarily manually) attaching in some manner that is accomplishable by a user of the plant transplanting machine (or plant transplanter) at least one of the plant punch elements described above. The step of extruding a plurality of propagules from a plurality of propagule transplant containers through action of the at least one transplant modality appropriate plant punch element refers to, e.g., forcibly punching and thereby removing from their containers propagules and/or propagule plugs by vertically moving punch elements so that they physically contact propagules and/or propagule plugs, thereby transplanting them into an adolescent plant tray.

The method of cultivating plants may further comprise the step of user-detaching at least one user-detachable plant punch element prior to accomplishing the step of user interconnecting the at least one transplant modality appropriate plant punch element, which refers to, e.g., a plant transplanter user's detaching of at least one plant punch element that is not appropriate to a given transplant modality before that user interconnects in its place a plant punch element that is appropriate to a given transplant modality. The step of user interconnecting the at least one transplant modality appropriate plant punch element may comprise the step of quick disconnect attaching the at least one transplant modality appropriate plant punch element; this step of quick disconnect attaching may refer to operating any type of attachment/detachment device that allows attachment of the desired punch element (in this case, at least one transplant modality appropriate plant punch element) using only a few (perhaps no more than one) step(s) (that may each be manual, e.g.). Such few steps may involve (as but one example), engaging the punch element to be attached as part of a punch element assembly, raising the punch element vertically with respect to a frame element, rotating the punch element with respect to a horizontal plant punch element support base sufficiently to position the punch element properly to enable locking, and releasing the punch element so that it may move vertically (perhaps under force from a spring) and become "locked" in a position from which it is able to be used to punch a propagule and/or propagule plug. The step of selecting at least one transplant modality appropriate plant punch element which is coordinated with the given transplant modality may comprise the step of selecting among a variable set of transplant modality appropriate plant punch elements, meaning that, a user may select from, e.g., an assembled collection(s) of plant punch elements, some of which exhibit different modalities (one or several exhibit perhaps a convex plant punch element head surface but are similar in other respects to other plant punch elements; others may be different from remaining plant punch elements in several respects (such as allowance for quadrant variance punching and plant divergence, as but a few examples)). The step of selecting among a variable set of transplant modality varying plant punch elements may comprise the step of selecting among parameters chosen from the group consisting of: size selection parameter; location selection parameter; convexity selection parameter; shape selection parameter; length selection parameter; plant divergence selection parameter; media intrusion selection parameter; circularity selection parameter; and quadrant variance selection parameter.

As compared with utilizing the unintrusive plant-divergent plant punch element as herein disclosed, use of the planar, flat-headed design results in increased damage to plants during the transplant process and therefore compromised yield and/or transplanted plant survivability rates. To achieve this plant-divergence, the plant punch element may be a convex plant punch element, which itself may be an at least about 45 degree convex plant punch element (see FIG. 29*a*), or an at least about 60 degree convex plant punch element (see FIG. 29*b*), meaning that a line tangent to the convex surface at its uppermost point (when installed) would be at least about 45 or sixty degrees, respectively. A plant transplanter may comprise a frame element, an interconnected propagule transplant container matrix guide responsive to the frame element and coordinated with a matrix of propagule transplant containers; an interconnected adolescent plant container matrix guide responsive to the frame element and situated parallel to at least a portion of the interconnected propagule transplant container matrix guide; an orthogonal plant punch support connected to the frame and situated substantially orthogonal to at least a portion of the interconnected matrix of propagule transplant containers when installed; a movement mechanism responsive to the orthogonal plant punch support; at least one unintrusive plant-divergent plant punch element responsive to the movement mechanism and capable of movement within the interconnected matrix of propagule transplant containers when installed; and an automated position system to which the interconnected matrix of propagule transplant containers are responsive when installed. The unintrusive plant-divergent plant punch element responsive to the movement mechanism and capable of movement within the matrix of propagule transplant containers when installed refers to, e.g., a plant punch element that is adapted, through perhaps a convex punch element head surface (or perhaps through a cylindrical or conical evacuated or hollow section evacuated along a lower portion of the punch element's length or perhaps using a slightly off-center punch (see FIG. 26*b*)), to push aside (or diverge) plant material such as a growing stem and perhaps some leaves of a propagule during a plant punching event, thereby mitigating damage to the punched plant. The term unintrusive is meant to characterize a plant punch element that, when used to punch a plant, is less intrusive upon that plant and that plant's growth media (such as soil) as compared with that amount of intrusion evident using a non-plant-divergent plant punch element. Thus, the unintrusive plant-divergent plant punch element may comprise a convex plant punch element, referring to the surface of a head of a plant punch element that is convex in shape. This convex plant punch element may be an at least about 45 degree convex plant punch element or may be an at least about 60 degree convex plant punch element. A corollary method of cultivating plants may comprise the steps of: determining to transfer a given plant species using a given transplant modality; obtaining an interconnected matrix of propagule transplant containers; unintrusively divergent punching a plurality of propagule transplant containers; and extruding a plurality of propagules from a plurality of propagule transplant containers. The step of unintrusively divergent punching a plurality of propagule transplant containers refers to, e.g., vertically moving at least one plant punch element substantially through the plane of an interconnected matrix of propagule transplant containers while pushing aside or diverging propagules in an unintrusive manner.

Another aspect of the invention is a consultable collection plant transplant process system that may be a consultable collection of plant process information utilizable (see Examples 1–11, e.g.), as by consultation, e.g., by a plant transplanter to improve the efficiency of the transplantation process, and thus of the nursery or greenhouse business. Such system may include a preferred plant punch element assembly use selection advisement information item (see Examples 1–5) (which may simply be a recommendation as to which plant punch element assembly to use) for at least one interconnected propagule transplant container matrix configuration with each of at least two alternative adolescent plant tray configurations. This "pairing" of an interconnected propagule transplant container matrix configuration with each of at least two alternative adolescent plant tray configurations may be referred to as an interconnected propagule transplant container matrix configuration/ alternative adolescent plant tray configuration combination. This consultable collection plant transplant process system may also (instead or additionally) include a plurality of operational compatibility conclusion information items regarding at least one interconnected propagule transplant container matrix configuration/alternative adolescent plant tray configuration combination (see Examples 1–5, e.g.). The system may also include at least one selectable adolescent plant tray output input, which refers to input(s) (such as type of plant punch element assembly (a term meant to include assembly configurations) and/or propagule plug tray configurations, as but a few examples) that may be used in conjunction with a propagule plug punch machine to transplant into a desired adolescent plant tray configuration (the output). Generally, the consultable collection plant transplant process system may include a collection of plant tray comparison information items. Although it is expected that the consultable collection of plant transplant information will typically find use after a nursery has determined which adolescent plant tray configuration a distributor is interested in presenting for sale to consumers, the invention also envisions a nursery, e.g., first determining which plant punch element assembly(s) it has available, which interconnected propagule transplant container matrix configuration(s) it has available, and then determining which adolescent plant tray configuration(s) it can transplant into.

The consultable collection plant transplant process system may comprise: a collection of plant tray comparison information items (see Examples 1–5); at least one selectable adolescent plant tray output inputs; a plurality of operational compatibility conclusion information items regarding at least one propagule tray configuration/alternative adolescent plant tray configuration combination (See Examples 1–5), wherein the at least one propagule tray configuration/ alternative adolescent plant tray configuration combination involves an interconnected porpagule transplant container matrix configuration and an alternative adolescent plant tray configuration (e.g., the 432 propagule transplant tray and a 6-06 tray); and at least one recommended plant punch assembly use selection advisement information item relative to each the propagule tray configuration/alternative adolescent plant tray configuration combinations. The collection of plant tray comparison information items may be any pieces of information, regardless of how presented, stored or recorded, that involve different plant trays, whether propagule transplant trays or adolescent plant trays (see Examples 1–11). The term operational compatibility conclusion information items regarding at least one propagule tray configuration/alternative adolescent plant tray configuration combination refers to, e.g., information as to whether a certain propagule tray configuration may be used to transplant into a certain adolescent plant tray configuration. The system's at least one recommended punch element assembly use selection advisement information item relative to each of the propagule tray configuration/alternative adolescent plant tray configuration combinations refers to a recommendation as to which punch element assembly to use far a certain propagule tray configuration/alternative adolescent plant tray configuration combination. The system may further comprise an estimated punched propagule plug placement position information item (see Examples 6–9) (e.g., any information regarding where a plug will be punched into an adolescent container), which may be schematically (e.g., relative to adolescent container borders or walls or retention circuits) presented and may indicate the expected or likely approximate position of a punched propagule (and perhaps the punched propagule plug) relative to adolescent plant tray container medians. The system may further comprise information items regarding the estimated number of unpunchable propagule plugs for each of said propagule tray configuration/alternative adolescent plant tray configuration combinations (see examples 1–5) so that a punch machine user, a nursery, or a greenhouse can predict propagules available for transplant into those adolescent containers that, for whatever reason, did not receive propagules during a punch event that was intended to supply that container with a propagule. A plug may be unpunchable because (as but one reason) the expected or estimated punched propagule plug placement position is unacceptably close to an adolescent container wall or is out of the intended target container. Such estimated number may be presented as, e.g., "3 rows remain in plug tray", or "all rows planted from plug tray" (see Examples 1–5, 6–9). These unpunchable propagule plug information items may also provide a useful estimate us to waste or unusable propagules. All information items may be usable by a plant punch machine operator or a nursery or greenhouse operator, e.g., in order to improve process efficiency. Once it is determined which plant punch assembly may be used, for example, for transplantation into a certain adolescent plant tray configuration, the user may improve yield and survivability of the transplanted propagules by selecting transplant modality appropriate plant punch elements and attaching them as at least some of the plant punch elements of the plant punch element assembly. Method of transplanting are also considered as part of the invention and may involve obtaining assembled predetermined information relative to plant trays (such step can be performed by securing, e.g., a printed assembly of such information, or even by remembering such information); selecting at least one adolescent plant tray output input (such as selecting a plant punch assembly); and ascertaining operational compatibility of at least one interconnected propagule transplant container matrix configuration/alternative adolescent plant tray configurations combination, wherein said combination involves at least one interconnected propagule transplant container matrix configuration with each of at least two alternative adolescent plant tray configurations; The method may further comprise the step of determining a recommended plant punch element assembly for each at least one of said interconnected propagule transplant container matrix configuration/alternative adolescent plant tray configurations combinations. The basic method may further comprise the step of determining a recommended propagule tray configuration. The step of ascertaining operational compatibility of at least one interconnected propagule transplant container matrix configuration (e.g., a propagule transplant tray configuration)/alternative adolescent plant tray configuration combination may be performed, e.g., by reading or examining a certain page of a printed assembly of predetermined information relative to trays (a pamphlet, or binder, e.g.) that gives compatibility information for the desired tray combination. One example of a claimed method is a greenhouse operator who has an order for a certain quantity of 6-06 finished trays and has several 432 propagule trays (or plug trays) and several 324 plug trays. Upon consulting the assembled predetermined information, the operator could determine the 432 and the 324 are each compatible with the 6-06 trays, that a D303A0079 punch plate is recommended with the 432 plug tray (an output input) and that a D303A0036 is recommended with the 324 plug tray (an output input). In another scenario, the operator could observe that he or she has a certain punch plate (e.g., D303A0035) and several 324 plug trays and that, with these output inputs, a plant punch machine could be used to punch 2-09 finished trays, 18-01T finished trays, 18-01(10.5×21) finished trays and/or 18-01(11×21) finished trays. The assembled predetermined information could also provide information as to unpunchable plug numbers and expected or estimated punched propagule plug placement position information items.

Another related method of transplanting plants may comprise the steps of: consulting a collection of plant transplant process information; obtaining plant transplant process information; customizing a plug transplant punch machine according to at least a portion of said plant transplant process information; transplanting at least a majority of propagule plugs using said customized plug transplant punch machine into a tray with an adolescent plant tray configuration. The step of obtaining plant process information may be performed upon consulting a collection of plant transplant process information and may involve, e.g., obtaining information regarding punch plate use for a given tray combination (i.e., a propagule tray/adolescent tray combination). The step of customizing a plug transplant punch machine according to at least a portion of the obtained plant transplant process information may involve installing a recommended punch plate onto such a punch machine, and/or securing a plug tray having a certain configuration (i.e., a 324 tray) onto the punch machine, e.g. The method may also comprise obtaining compatibility information for at least one tray configuration combination (or tray combination). Favorable compatibility may be indicated by the absence of any negative compatibility indication (e.g., not recommended would indicate incompatibility). The step of determining a preferred propagule plug tray configuration may be performed upon determining a plug tray configuration (e.g., the 432) that may be used to punch into finished trays of a desired configuration and may be performed even where an operator already knows what propagule plug tray configuration he or she intends to use before consulting any assembled collection of information.

The foregoing discussion and the claims, which follow, describe the preferred embodiments of the present invention. Particularly with respect to the claims, it should be understood that changes may be made without departing from the essence of the invention. In this regard, it is intended that such changes would still fall within the scope of the patent. It is simply not practical to describe and claim all possible revisions to the present invention which may be accomplished. To the extent any revision utilizes the essence of any one of the features of the present invention, it would naturally fall within the breadth of protection encompassed by this patent. This is particularly true for the present invention since its basic concepts and understandings are fundamental in nature and can be broadly applied. Any changes or modifications made without departing from the broad aspects of the present invention are intended to be encompassed by this patent.

As can be easily understood from the foregoing, the basic concepts of the present invention may be embodied in a variety of ways. It involves both transplanting techniques as well as devices to accomplish the appropriate transplanting. In this application, the transplanting techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this non-provisional application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims which will be included in a full patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon by the claims of this patent application. The non-provisional patent application seeks examination of as broad a base of claims as deemed within the applicant's right and is designed to yield a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "transplanter" should be understood to encompass disclosure of the act of "transplanting"—whether explicitly discussed or not—and, conversely, were there effectively disclosure of the act of "transplanting", such a disclosure should be understood to encompass disclosure of a "transplanter" and even a "means for transplanting" Such changes and alternative terms are to be understood to be explicitly included in the description.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to claim at least: i) each of the transplant devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, x) the various combinations and permutations of each of the elements disclosed, and xi) each potentially dependent claim or concept as a dependency on each and every one of the independent claims or concepts presented. In this regard it should be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

The claims set forth in this specification by are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

We claim:

1. A mechanized plant transplant apparatus comprising:
   a. a matrix of propagule transplant containers, wherein at least a majority of said propagule transplant containers is each adapted to contain propagule growth medium and at least one propagule, is established by at least one propagule growth medium retention element and has a substantially horizontal upper container opening area which is larger than a plant punch element head area;
   b. a yieldable exit element established integral to said at least one propagule growth medium retention element;
   c. an areally continuous, substantially planar, arrayed, propagule growth support lattice element interconnecting said matrix of propagule transplant containers;
   d. an integral edge definition element which defines a large number of said propagule transplant containers that are operationally compatible with a numerically significant number of alternative adolescent plant tray configurations; and
   e. a tray movement guide responsive to said integral edge definition element,
   wherein said large number of said propagule transplant containers is greater than the number of adolescent plant containers of each of said alternative adolescent plant tray configurations,
   wherein each of said at least a majority of said propagule transplant containers is volumetrically smaller than

29 each of the adolescent plant containers of each of said alternative adolescent plant tray configurations, wherein each of the adolescent plant containers of each of said alternative adolescent plant tray configurations is capable of receiving at least one propagule plug from one of said propagule transplant containers, wherein the number of propagule transplant containers is both:—an integer multiple of a first number of containers of at least a first adolescent plant tray configuration, and—a non-integer multiple of a second number of containers of at least a second adolescent plant tray configuration, wherein said large number of said propagule transplant containers that are operationally compatible with a numerically significant number of alternative adolescent plant tray configurations is greater than 300, wherein said large number of said propagule transplant containers is a number that is evenly divisible by all but two of the first eight integer multiples of six, and wherein said plant transplant apparatus is usable to fill at least thirty-five alternative adolescent plant tray configurations with propagules so that resultant plug placement positions relative to walls of the adolescent plant containers of said at least thirty-five alternative adolescent plant tray configurations are acceptable.

2. A mechanized plant transplant apparatus as described in claim 1 wherein operationally compatible indicates that said large number of said propagule transplant containers divided by said number of adolescent plant containers is an integer number having as a remainder a number that is a member of at least one number set selected from the group of number sets consisting of: zero, less than 13, less than 17, less than 33, and less than 19.

3. A mechanized plant transplant apparatus as described in claim 2 wherein said numerically significant number of alternative adolescent plant tray configurations is a numerically significant number of alternative, non-square adolescent plant tray configurations and is a number that is a member of at least one number set selected from the group of number sets consisting of:

greater than 27, greater than 29, greater than 33, greater than 34, greater than 11, greater than 13, greater than that number corresponding to about 39 percent of alternative, non-square adolescent plant tray configurations, greater than that number corresponding to about 46 percent of alternative, non-square adolescent plant tray configurations, greater than that number corresponding to about 54 percent of alternative, non-square adolescent plant tray configurations, greater than that number corresponding to about 58 percent of alternative, non-square adolescent plant tray configurations.

greater than that number corresponding to about 66 percent of alternative, non-square adolescent plant tray configurations, and greater than that number corresponding to about 68 percent of alternative, non-square adolescent plant tray configurations.

30

4. A mechanized plant transplant apparatus as described in claim 1 wherein said large number of said propagule transplant containers is 432.

5. A mechanized plant transplant apparatus as described in claim 1 wherein said large number of said propagule transplant containers are arranged in a twelve by thirty-six matrix.

6. A mechanized plant transplant apparatus comprising:

a. a matrix of propagule transplant containers, wherein at least a majority of said propagule transplant containers is each adapted to contain propagule growth medium and at least one propagule, is established by at least one propagule growth medium retention element and has a substantially horizontal upper container opening area which is larger than a plant punch element head area;

b. a yieldable exit element established integral to said at least one propagule growth medium retention element;

c. an areally continuous, substantially planar, arrayed, propagule growth support lattice element interconnecting said matrix of propagule transplant containers;

d. an integral edge definition element which defines a large number of said propagule transplant containers that are operationally compatible with a numerically significant number of alternative adolescent plant tray configurations; and e. a tray movement guide responsive to said integral edge definition element, wherein said large number of said propagule transplant containers is greater than the number of adolescent plant containers of each of said alternative adolescent plant tray configurations, wherein each of said at least a majority of said propagule transplant containers is volumetrically smaller than each of the adolescent plant containers of each of said alternative adolescent plant tray configurations, wherein each of the adolescent plant containers of each of said alternative adolescent plant tray configurations is capable of receiving at least one propagule plug from one of said propagule transplant containers, wherein the number of propagule transplant containers is both:—an integer multiple of a first number of containers of at least a first adolescent plant tray configuration, and—a non-integer multiple of a second number of containers of at least a second adolescent plant tray configuration, wherein said large number of said propagule transplant containers that are operationally compatible with a numerically significant number of alternative adolescent plant tray configurations is greater than 300, wherein said large number of said propagule transplant containers is a number that is evenly divisible by all but two of the first six integer multiples of six, and wherein said plant transplant apparatus is usable to fill at least thirty-eight alternative adolescent plant tray configurations with propagules so that resultant plug placement positions relative to walls of the adolescent plant containers of said at least thirty-eight alternative adolescent plant tray configurations are acceptable.

7. A mechanized plant transplant apparatus as described in claim 6 wherein operationally compatible indicates that said large number of said propagule transplant containers divided by said number of adolescent plant containers is an integer number having as a remainder a number that is a member of at least one number set selected from the group of number sets consisting of:

zero,
less than 5,
less than 10,
less than 25, and
less than 37.

8. A mechanized plant transplant apparatus as described in claim 7 wherein said numerically significant number of alternative adolescent plant tray configurations is a numerically significant number of alternative, non-square adolescent plant tray configurations and is a member of at least one number set selected from the group of number sets consisting of:
greater than 9,
greater than 14,
greater than 15,
greater than 17,
greater than 23,
greater than 24,
greater than 26,
greater than 38,
greater than that number corresponding to about 16 percent of alternative, non-square adolescent plant tray configurations,
greater than that number corresponding to about 26 percent of alternative, non-square adolescent plant tray configurations,
greater than that number corresponding to about 28 percent of alternative, non-square adolescent plant tray configurations,
greater than that number corresponding to about 32 percent of alternative, non-square adolescent plant tray configurations,
greater than that number corresponding to about 44 percent of alternative, non-square adolescent plant tray configurations,
greater than that number corresponding to about 46 percent of alternative, non-square adolescent plant tray configurations,
greater than that number corresponding to about 48 percent of alternative, non-square adolescent plant tray configurations,
greater than that number corresponding to about 52 percent of alternative, non-square adolescent plant tray configurations, and
greater than that number corresponding to about 72 percent of alternative, non-square adolescent plant tray configurations.

9. A mechanized plant transplant apparatus as described in claim 6 wherein said large number of said propagule transplant containers is 324.

10. A mechanized plant transplant apparatus as described in claim 6 wherein said larger number of said propagule transplant containers are arranged in a twelve by twenty-seven matrix.

11. A mechanized plant transplant apparatus comprising:
a. a matrix of propagule transplant containers, wherein at least a majority of said propagule transplant containers is each adapted to contain propagule growth medium and at least one propagule, is established by at least one propagule growth medium retention element and has a substantially horizontal upper container opening area which is larger than a plant punch element head area;
b. a yieldable exit element established integral to said at least one propagule growth medium retention element;
c. an areally continuous, substantially planar, arrayed, propagule growth support lattice element interconnecting said matrix of propagule transplant containers;
d. an integral edge definition element which defines a large number of said propagule transplant containers that is are operationally compatible with a numerically significant number of alternative adolescent plant tray configurations; and
e. a tray movement guide responsive to said integral edge definition element, wherein said large number of said propagule transplant containers is greater than the number of adolescent plant containers of each of said alternative adolescent plant tray configurations,
wherein each of said at least a majority of said propagule transplant containers is volumetrically smaller than each of the adolescent plant containers of each of said alternative adolescent plant tray configurations.
wherein each of the adolescent plant containers of each of said alternative adolescent plant tray configurations is capable of receiving at least one propagule plug from one of said propagule transplant containers,
wherein the number of propagule transplant containers is both:—an integer multiple a first number of containers of at least a first adolescent plant tray configuration, and—a non-integer multiple of a second number of containers of at least a second adolescent plant tray configuration,
wherein said large number of said propagule transplant containers that are operationally compatible with a numerically significant number of alternative adolescent plant tray configurations is greater than 300,
wherein said large number of said propagule transplant containers is a number that is evenly divisible by all of the first six integer multiples of six, and
wherein said plant transplant apparatus is usable to fill at least four alternative adolescent plant tray configurations with propagules so that resultant plug placement positions relative to walls of the adolescent plant containers of said at least four alternative adolescent plant tray configurations are acceptable.

12. A mechanized plant transplant apparatus as described in claim 11 wherein operationally compatible indicates that said large number of said propagule transplant containers divided by said number of adolescent plant containers is an integer number having as a remainder a number that is a member of at least one number set selected from the group of number sets consisting of: zero, and less than 25.

13. A mechanized plant transplant apparatus as described in claim 12 wherein said numerically significant number of alternative adolescent plant tray configurations is a numerically significant number of alternative, non-square adolescent plant tray configurations and is a member of at least one number set selected from the group of number sets consisting of: greater than 2, greater than 3, greater than that number corresponding to about 4 percent of alternative, non-square adolescent plant tray configurations, and greater than that number corresponding to about 6 percent of alternative, non-square adolescent plant tray configurations.

14. A mechanized plant transplant apparatus as described in claim 11 wherein said large number of said propagule transplant containers is 360.

15. A mechanized plant transplant apparatus as described in claim 11 wherein said large number of said propagule transplant containers are arranged in a eighteen by twenty matrix.

16. A mechanized plant transplant apparatus comprising:
   a. a matrix of propagule transplant containers, wherein at least a majority of said propagule transplant containers is each adapted to contain propagule growth medium and at least one propagule, is established by at least one propagule growth medium retention element and has a substantially horizontal upper container opening area which is larger than a plant punch element head area;
   b. a yieldable exit element established integral to said at least one propagule growth medium retention element;
   c. an areally continuous, substantially planar, arrayed, propagule growth support lattice element interconnecting said matrix of propagule transplant containers;
   d. an integral edge definition element which defines a large number of said propagule transplant containers that are operationally compatible with a numerically significant number of alternative adolescent plant tray configurations; and
   e. a tray movement guide responsive to said integral edge definition element,
   wherein said large number of said propagule transplant containers is greater than the number of adolescent plant containers of each of said alternative adolescent plant tray configurations,
   wherein each of said at least a majority of said propagule transplant containers is volumetrically smaller than each of the adolescent plant containers of each of said alternative adolescent plant tray configurations,
   wherein each of the adolescent plant containers of each of said alternative adolescent plant tray configurations is capable of receiving at least one propagule plug from one of said propagule transplant containers,
   wherein the number of propagule transplant containers is both:—an integer multiple of a first number of containers of at least a first adolescent plant tray configuration, and —a non-integer multiple of a second number of containers of at least a second adolescent plant tray configuration,
   wherein said large number of said propagule transplant containers that are operationally compatible with a numerically significant number of alternative adolescent plant tray configurations are arranged in a nine by twenty-seven matrix, and
   wherein said plant transplant apparatus is usable to fill at least eight alternative adolescent plant tray configurations with propagules so that resultant plug placement positions relative to walls of the adolescent plant containers of said at least eight alternative adolescent plant tray configurations are acceptable.

17. A mechanized plant transplant apparatus as described in claim 16 wherein operationally compatible indicates that twice said large number of said propagule transplant containers divided by said number of adolescent plant containers is an integer number having as a remainder a number that is a member of at least one number set selected from the group of number sets consisting of:
   zero,
   less than 7,
   less than 12,
   leas than 19,
   less than 39, and
   less than 45.

18. A mechanized plant transplant apparatus as described in claim 17 wherein said numerically significant number of alternative adolescent plant tray configurations is a numerically significant number of alternative, square adolescent plant tray configurations is a member of at least one number set selected from the group of number sets consisting of:
   greater than or equal to one,
   greater than or equal to three,
   greater than or equal to four,
   greater than or equal to five,
   greater than or equal to six,
   greater than or equal to seven,
   greater than or equal to that number corresponding to about 14 percent of alternative, square adolescent plant tray configurations,
   greater than or equal to that number corresponding to about 42 percent of alternative, square adolescent plant tray configurations,
   greater than or equal to that number corresponding to about 57 percent of alternative, square adolescent plant tray configurations,
   greater than or equal to that number corresponding to about 71 percent of alternative, square adolescent plant tray configurations,
   greater than or equal to that number corresponding to about 85 percent of alternative, square adolescent plant tray configurations, and
   equal to that number corresponding to about 100 percent of alternative, square adolescent plant tray configurations.

19. A mechanized plant transplant apparatus as described in claim 16 wherein said large number of said propagule transplant containers is 243.

20. A mechanized plant transplant apparatus as described in claim 1, 6, 10, or 14 wherein the number of adolescent plant containers of at least one of said alternative adolescent plant tray configurations is a number selected from the group of numbers consisting of: 15, 18, 20, 32, 36, 40, 48, 54, 60 and 72.

21. A method of mechanized plant transplantation comprising the steps of:
   a. establishing a matrix of propagule transplant containers;
   b. adapting each of a plurality of said propagule transplant containers to contain one propagule growth medium and at least one propagule;
   c. establishing said each of a plurality of said propagule transplant containers with at least one propagule growth medium retention element;
   d. creating said each of a plurality of said propagule transplant containers with an upper container opening area that is larger than a plant punch element head area;
   e. establishing a yieldable exit element as part of said at least one propagule growth medium retention element;
   f. interconnecting said matrix of propagule transplant containers by an areally continuous, substantially planar, arrayed, propagule growth support lattice element;
   g. defining with an integral edge definition element a large number of said propagule transplant containers that are operationally compatible with a numerically significant number of alternative adolescent plant tray configurations;
   h. adapting each of a plurality of adolescent plant containers of each of said alternative adolescent plant tray configurations to receive at least one propagale plug from a one of said plurality of said propagule transplant containers; and i. establishing a tray movement guide that is responsive to said integral edge definition element, wherein said step of defining with an integral edge definition element a large number of said propagule transplant containers comprises the step of defining with an integral edge definition element a number of that is larger than the number of adolescent plant containers of each of said alternative adolescent plant tray configurations, wherein said step of adapting each of a plurality of said propagule transplant containers to contain propagule growth medium and at least one propagule comprises the step of dimensioning each of said plurality of said propagule transplant containers to be volumetrically smaller than each of said adolescent plant containers of each of said alternative adolescent plant tray configurations, wherein the number of propagule transplant containers is both:—an integer multiple of a first number of containers of at least a first adolescent plant tray configuration, and—a non-integer multiple of a second number of containers of at least a second adolescent plant tray configuration, wherein said large number of said propagule transplant containers that is operationally compatible with a numerically significant number of alternative adolescent plant tray configurations is greater than 300, wherein said large number is evenly divisible by all but two of the first eight integer multiples of six, and wherein said method of plant transplantion is usable to fill at least thirty-five alternative adolescent plant tray configurations with propagules so that resultant plug placement positions relative to walls of the adolescent plant containers of said at least thirty-five alternative adolescent plant tray configurations are acceptable.

22. A method of mechanized plant transplantation as described in claim 21 wherein said large number of propagule transplant containers are arranged in a twelve by thirty-six matrix.

23. A mechanized plant transplant apparatus as described in claim 1 or 6 wherein the number of rows of said propagule transplant containers is an integer multiple of 12.

24. A mechanized plant transplant apparatus as described in claim 1, 6, 11, or 16 wherein said at least one propagule growth medium retention element is a frustum propagule growth medium retention wall.

25. A plug punch transplant machine operating on the mechanized plant transplant apparatus of claim 1, 6, 11, or 16.

26. Plants transplanted from propagules contained in the mechanized plant transplant apparatus of claim 1, 6, 11, or 16.

27. A method of mechanized plant transplantation as described in claim 21 wherein operationally compatible indicates that said large number of said propagule transplant containers divided by said number of adolescent plant containers is an integer number having as a remainder a number that is a member of at least one number set selected from the group of number sets consisting of:

zero, less than 13, less than 17, less than 33, and less than 19.

28. A method of mechanized plant transplantation as described in claim 27 wherein said numerically significant number of alternative adolescent plant tray configurations is a numerically significant number of alternative, non-square adolescent plant tray configurations and is a number that is a member of at least one number set selected from the group of number sets consisting of:

greater than 27, greater than 29, greater than 33, greater than 34, greater than 11, greater than 13, greater than that number corresponding to about 39 percent of alternative, non-square adolescent plant tray configurations, greater than that number corresponding to about 46 percent of alternative, non-square adolescent plant tray configurations, greater than that number corresponding to about 54 percent of alternative, non-square adolescent plant tray configurations, greater than that number corresponding to about 58 percent of alternative, non-square adolescent plant tray configurations, greater than that number corresponding to about 66 percent of alternative, non-square adolescent plant tray configurations, and greater than that number corresponding to about 68 percent of alternative, non-square adolescent plant tray configurations.

29. A method of mechanized plant transplantation as described in claim 21 wherein said step of defining with an integral edge definition element a large number of said propagule transplant containers that is operationally compatible with a numerically significant number of alternative adolescent plant tray configurations comprises the step of defining 432 propagule transplant containers.

30. A method of mechanized plant transplantation comprising the steps of:

a. establishing a matrix of propagule transplant containers;

b. adapting each of a plurality of said propagule transplant containers to contain one propagule growth medium and at least one propagule;

c. establishing said each of a plurality of said propagule transplant containers with at least one propagule growth medium retention element;

d. creating said each of a plurality of said propagule transplant containers with an upper container opening area that is larger than a plant punch element head area;

e. establishing a yieldable exit element as part of said at least one propagule growth medium retention element;

f. interconnecting said matrix of propagule transplant containers by an areally continuous, substantially planar, arrayed, propagule growth support lattice element;

g. defining with an integral edge definition element a large number of said propagule transplant containers that are operationally compatible with a numerically significant number of alternative adolescent plant tray configurations;

h. adapting each of a plurality of adolescent plant containers of each of said alternative adolescent plant tray configurations to receive at least one propagule plug from a one of said plurality of said propagule transplant containers; and i. establishing a tray movement guide that is responsive to said integral edge definition element, wherein said step of defining with an integral edge definition element a large number of said propagule transplant containers comprises the step of defining with an integral edge definition element a number of that is larger than the number of adolescent plant containers of each of said alternative adolescent plant tray configurations, wherein said step of adapting each of a plurality of said propagule transplant containers to contain propagule growth medium and at least one propagule comprises the step of dimensioning each of said plurality of said propagule transplant containers to be volumetrically smaller than each of said adolescent plant containers of each of said alternative adolescent plant tray configurations, wherein the number of propagule transplant containers both—an integer multiple of a first number of containers of at least a first adolescent plant tray configuration, and —a non-integer multiple of a second number of containers of at least a second adolescent plant tray configuration, wherein said large number of said propagule transplant containers that is operationally compatible with a numerically significant number of alternative adolescent plant tray configurations is greater than 300, wherein said large number is evenly divisible by all but two of the first six integer multiples of six, and wherein said method of plant transplantion is usable to fill at least thirty-eight alternative adolescent plant tray configurations with propagules so that resultant plug placement positions relative to walls of the adolescent plant containers of said at least thirty-eight alternative adolescent plant tray configurations are acceptable.

31. A method of mechanized plant transplantation as described in claim 30 wherein operationally compatible indicates that said large number of said propagule transplant containers divided by said number of adolescent plant containers is an integer number having as a remainder a number that is a member of at least one number set selected from the group of number sets consisting of:

zero, less than 5, less than 10, less than 25, and less than 37.

32. A method of mechanized plant transplantation as described in claim 31 wherein said numerically significant number of alternative adolescent plant tray configurations is a numerically significant number of alternative, non-square adolescent plant tray configurations and is a member of at least one number set selected from the group of number sets consisting of:

greater than 9, greater than 14, greater than 15, greater than 17, greater than 23, greater than 24, greater than 26, greater than 38, greater than that number corresponding to about 16 percent of alternative, non-square adolescent plant tray configurations, greater than that number corresponding to about 26 percent of alternative, non-square adolescent plant tray configurations, greater than that number corresponding to about 28 percent of alternative, non-square adolescent plant tray configurations, greater than that number corresponding to about 32 percent of alternative, non-square adolescent plant tray configurations, greater than that number corresponding to about 44 percent of alternative, non-square adolescent plant tray configurations, greater than that number corresponding to about 46 percent of alternative, non-square adolescent plant tray configurations, greater than that number corresponding to about 48 percent of alternative, non-square adolescent plant tray configurations, greater than that number corresponding to about 52 percent of alternative, non-square adolescent plant tray configurations, and greater than that number corresponding to about 72 percent of alternative, non-square adolescent plant tray configurations.

33. A method of mechanized plant transplantation as described in claim 30 wherein said step of defining with an integral edge definition element a large number of said propagule transplant containers that is operationally compatible with a numerically significant number of alternative adolescent plant tray configurations comprises the step of defining 324 propagule transplant containers.

34. A method of mechanized plant transplantation comprising the steps of:

a. establishing a matrix of propagule transplant containers;

b. adapting each of a plurality of said propagule transplant containers to contain one propagule growth medium and at least one propagule;

c. establishing said each of a plurality of said propagule transplant containers with at least one propagule growth medium retention element;

d. creating said each of a plurality of said propagule transplant containers with an upper container opening area that is larger than a plant punch element head area;

e. establishing a yieldable exit element as part of said at least one propagule growth medium retention element;

f. interconnecting said matrix of propagule transplant containers by an areally continuous, substantially planar, arrayed, propagule growth support lattice element;

g. defining with an integral edge definition element a large number of said propagule transplant containers that are operationally compatible with a numerically significant number of alternative adolescent plant tray configurations;

h. adapting each of a plurality of adolescent plant containers of each of said alternative adolescent plant tray configurations to receive at least one propagule plug from a one of said plurality of said propagule transplant containers; and i. establishing a tray movement guide that is responsive to said integral edge definition element, wherein said step of defining with an integral edge definition element a large number of said propagule transplant containers comprises the step of defining with an integral edge definition element a number of that is larger than the number of adolescent plant containers of each of said alternative adolescent plant tray configurations, wherein said step of adapting each of a plurality of said propagule transplant containers to contain propagule growth medium and at least one propagule comprises the step of dimensioning each of said plurality of said propagule transplant containers to be volumetrically smaller than each of said adolescent plant containers of each of said alternative adolescent plant tray configurations, wherein the number of propagule transplant containers is both:—an integer multiple of a first number of containers of at least a first adolescent plant tray configuration, and —a non-integer muliple of a second number of containers of at least a second adolescent plant tray configuration, wherein said large number of said propagule transplant containers that is operationally compatible with a numerically significant number of alternative adolescent plant tray configurations is greater than 300, wherein said large number is evenly divisible by all of the first six integer multiples of six, and wherein said method of plant transplantion is usable to fill at least four alternative adolescent plant tray configurations with propagules so that resultant plug placement positions relative to walls of the adolescent plant containers of said at least four alternative adolescent plant tray configurations are acceptable.

35. A method of mechanized plant transplantation as described in claim 34 wherein operationally compatible indicates that said large number of said propagule transplant containers divided by said number of adolescent plant containers is an integer number having as a remainder a number that is a member of at least one number set selected from the group of number sets consisting of:

zero, and less than 25.

36. A method of mechanized plant transplantation as described in claim 35 wherein said numerically significant number of alternative adolescent plant tray configurations is a numerically significant number of alternative, non-square adolescent plant tray configurations and is a member of at least one number set selected from the group of number sets consisting of:

greater than 2, greater than 3, greater than that number corresponding to about 4 percent of alternative, non-square adolescent plant tray configurations, and greater than that number corresponding to about 6 percent of alternative, non-square adolescent plant tray configurations.

37. A method of mechanized plant transplantation as described in claim 34 wherein said step of defining with an integral edge definition element a configured, large number of said propagule transplant containers that is operationally compatible with a numerically significant number of alternative adolescent plant tray configurations comprises the step of defining 360 propagule transplant containers.

38. A method of mechanized plant transplantation comprising the steps of:

a. establishing a matrix of propagule transplant containers;

b. adapting each of a plurality of said propagule transplant containers to contain one propagule growth medium and at least one propagule;

c. establishing said each of a plurality of said propagule transplant containers with at least one propagule growth medium retention element;

d. creating said each of a plurality of said propagule transplant containers with an upper container opening area that is larger than a plant punch element head area;

e. establishing a yieldable exit element as part of said at least one propagule growth medium retention element;

f. interconnecting said matrix of propagule transplant containers by an areally continuous, substantially planar, arrayed, propagule growth support lattice element;

g. defining with an integral edge definition element a large number of said propagule transplant containers that are operationally compatible with at least eight alternative adolescent plant tray configurations;

h. adapting each of a plurality of adolescent plant containers of each of said alternative adolescent plant tray configurations to receive at least one propagule plug from a one of said plurality of said propagule transplant containers; and establishing a tray movement guide that is responsive to said integral edge definition element, wherein said step of defining with an integral edge definition element a large number of said propagule transplant containers comprises the step of defining with an integral edge definition element a number of that is larger than the number of adolescent plant containers of each of said alternative adolescent plant tray configurations, wherein the number of propagule transplant containers is both:—an integer multiple of a first number of containers of at least a first adolescent plant tray configuration, and—a non-integer multiple of a second number of containers of at least a second adolescent plant tray configuration, wherein said step of adapting each of a plurality of said propagule transplant containers to contain propagule growth medium and at least one propagule comprises the step of dimensioning each of said plurality of said propagule transplant containers to be volumetrically smaller than each of said adolescent plant containers of each of said alternative adolescent plant tray configurations, wherein said large number of said propagule transplant containers that is operationally compatible with at least eight alternative adolescent plant tray configurations is 243, and wherein said method of plant transplantion is usable to fill at least eight alternative adolescent plant tray configurations with propagules so that resultant plug placement positions relative to walls of the adolescent plant containers of said at least eight alternative adolescent plant tray configurations are acceptable.

39. A method of mechanized plant transplantation as described in claim 38 wherein operationally compatible indicates that twice said large number of said propagule transplant containers divided by said number of adolescent plant containers is an integer number having as a remainder a number that is a member of at least one number set selected from the group of number sets consisting of: zero, less than 7. less than 12, less than 19, less than 39, and less than 45.

40. A method of mechanized plant transplantation as described in claim 39 wherein said numerically significant number of alternative adolescent plant tray configurations is a numerically significant number of alternative, square adolescent plant tray configurations is a member of at least one number set selected from the group of number sets consisting of:

greater than or equal to one, greater than or equal to three, greater than or equal to four, greater than or equal to five, greater than or equal to six, greater than or equal to seven, greater than or equal to that number corresponding to about 14 percent of alternative, square adolescent plant tray configurations, greater than or equal to that number corresponding to about 42 percent of alternative, square adolescent plant tray configurations, greater than or equal to that number corresponding to about 57 percent of alternative, square adolescent plant tray configurations, greater than or equal to that number corresponding to about 71 percent of alternative, square adolescent plant tray configurations, greater than or equal to that number corresponding to about 85 percent of alternative, square adolescent plant tray configurations, and equal to that number corresponding to about 100percent of alternative, square adolescent plant tray configurations.

41. A method of mechanized plant transplantation as described in claim 38 wherein said 243 propagule transplant containers are arranged in a nine by twenty-seven matrix.

42. A method of mechanized plant transplantation as described in claim 21, 30, 34, or 38, wherein said step of defining with an integral edge definition element a number of said propagule transplant containers comprises the step of defining with an integral edge definition element a number that is larger than a number of adolescent plant containers of each of said alternative adolescent plant tray configurations, at least one of which has a number of a plurality of adolescent plant containers that is selected from the group of numbers consisting of: 15, 18, 20, 32, 36, 40, 48, 54, 60 and 72.

43. A mechanized plant transplantation method as described in claim 21, 30, 34, or 38, wherein the number of adolescent plant containers of at least one of said alternative adolescent plant tray configurations is a number selected from the group of numbers consisting of: 15, 18, 20, 32, 36, 40, 48, 54, 60 and 72.

44. A plug punch transplant machine operated using the method of claim 21, 30, 34, or 38.

45. Plants transplanted using the mechanized plant transplantation method of claim 21, 30, 34, or 38.

46. A method of mechanized plant transplantation as described in claim 30 wherein said large number of propagule transplant containers are arranged in a twelve by twenty-seven matrix.

47. A method of mechanized plant transplantation as described in claim 34 wherein said large number of propagule transplant containers are arranged in an eighteen by twenty matrix.

* * * * *